(12) United States Patent
Kimura et al.

(10) Patent No.: US 11,320,593 B2
(45) Date of Patent: May 3, 2022

(54) OPTICAL FIBER CLEAVER AND OPTICAL FIBER CLEAVING METHOD

(71) Applicants: SUMITOMO ELECTRIC INDUSTRIES, LTD., Osaka (JP); JAPAN COMMUNICATION ACCESSORIES MANUFACTURING CO., LTD., Komaki (JP)

(72) Inventors: Motoyoshi Kimura, Komaki (JP); Daizo Nishioka, Osaka (JP); Yusuke Takai, Komaki (JP); Kazuyuki Miwa, Komaki (JP); Tsuyoshi Imaizumi, Osaka (JP)

(73) Assignees: SUMITOMO ELECTRIC INDUSTRIES, LTD., Osaka (JP); JAPAN COMMUNICATION ACCESSORIES MANUFACTURING CO., LTD., Komaki (JP)

(*) Notice: Subject to any disclaimer, the term of this patent is extended or adjusted under 35 U.S.C. 154(b) by 54 days.

(21) Appl. No.: 16/772,658

(22) PCT Filed: Dec. 11, 2018

(86) PCT No.: PCT/JP2018/045492
§ 371 (c)(1),
(2) Date: Jun. 12, 2020

(87) PCT Pub. No.: WO2019/117139
PCT Pub. Date: Jun. 20, 2019

(65) Prior Publication Data
US 2021/0080652 A1 Mar. 18, 2021

(30) Foreign Application Priority Data

Dec. 12, 2017 (JP) .............................. JP2017-237521

(51) Int. Cl.
*G02B 6/25* (2006.01)

(52) U.S. Cl.
CPC ...................................... *G02B 6/25* (2013.01)

(58) Field of Classification Search
CPC ......... G02B 6/25; B23D 25/04; Y10T 83/476; Y10T 83/4763; Y10T 83/887
(Continued)

(56) References Cited

U.S. PATENT DOCUMENTS 6,244,488 B1     6/2001   Tanaka
7,305,169 B2 *  12/2007   Honma ..................... G02B 6/25
                                                             385/136
(Continued)

FOREIGN PATENT DOCUMENTS

JP    H06-186436 A    7/1994
JP    H09-311226 A   12/1997
(Continued)

*Primary Examiner* — Evan H Macfarlane
*Assistant Examiner* — Liang Dong
(74) *Attorney, Agent, or Firm* — Oliff PLC

(57) ABSTRACT

An optical fiber cleaver includes: a body unit on which an optical fiber extending in a first direction is loaded; a lid unit connected to the body unit to be rotatable and openable; a pair of retainers arranged to be separate from each other in the first direction and retain the optical fiber between the pair of retainers when the lid unit is closed with respect to the body unit; a blade member that comes into contact with the optical fiber from one direction side of a second direction intersecting the first direction between the pair of retainers and hurt the optical fiber; and a movement unit that brings the blade member into contact with the optical fiber from the one direction side of the second direction and move the blade member to one direction side of a third direction intersecting the first direction and the second direction.

15 Claims, 29 Drawing Sheets

(58) Field of Classification Search
USPC .......................... 225/2, 94–105; 83/646–647
See application file for complete search history.

(56) References Cited

U.S. PATENT DOCUMENTS

| | | | | |
|---|---|---|---|---|
| 9,016,535 | B2* | 4/2015 | Hasegawa | G02B 6/25 225/96 |
| 2005/0169594 | A1 | 8/2005 | Song | |
| 2008/0115646 | A1* | 5/2008 | Simokovic | B23D 23/00 83/588 |
| 2009/0224019 | A1* | 9/2009 | Ohtsuka | G02B 6/25 225/2 |
| 2010/0187276 | A1 | 7/2010 | Ohmura et al. | |
| 2011/0262101 | A1 | 10/2011 | Slater et al. | |
| 2014/0299645 | A1* | 10/2014 | Lurie | G02B 6/25 225/96 |

FOREIGN PATENT DOCUMENTS

| | | |
|---|---|---|
| JP | 2004-527781 A | 9/2004 |
| JP | 2013-218233 A | 10/2013 |
| JP | 2016-514860 A | 5/2016 |
| KR | 10-2016-0053128 A | 5/2016 |
| WO | 02/044778 A1 | 6/2002 |
| WO | 2012/108242 A1 | 8/2012 |
| WO | 2014/168758 A1 | 10/2014 |

\* cited by examiner

OPTICAL FIBER CLEAVER AND OPTICAL FIBER CLEAVING METHOD

TECHNICAL FIELD

The present disclosure relates to an optical fiber cleaver and an optical fiber cleaving method.

The present application claims priority from Japanese application JP 2017-237521 filed on Dec. 12, 2017, the content of which is hereby incorporated by reference into this application.

BACKGROUND ART

An optical fiber cleaving device that moves a disc-shaped blade member in a state in which a glass fiber portion of an optical fiber is tightly pressed and creates a flaw in the surface of the glass fiber portion is known (see Patent Literature 1).

CITATION LIST

Patent Literature

[PATENT LITERATURE 1] JP H6-186436 A

SUMMARY OF INVENTION

Solution to Problem

To achieve an objective of the present disclosure, an optical fiber cleaver according to the present disclosure includes: a body unit on which an optical fiber extending in a first direction is loaded; a lid unit that connected to the body unit to be rotatable and configured to be openable with respect to the body unit; a pair of retainers arranged to be separate from each other in the first direction and retain the optical fiber between the pair of retainers when the lid unit is closed with respect to the body unit; a blade member configured to come into contact with the optical fiber from one direction side of a second direction intersecting the first direction between the pair of retainers and creates a flaw in the optical fiber; and a movement unit configured as a movement unit moving the blade member and configured to bring the blade member into contact with the optical fiber from the one direction side of the second direction and move the blade member to one direction side of a third direction intersecting the first and second directions.

To achieve an objective of the present disclosure, an optical fiber cleaving method according to the present disclosure includes: a first step of creating a flaw in an optical fiber using the above-described optical fiber cleaver; and a second step of cleaving the optical fiber by bending the optical fiber using a pressing unit further included in the optical fiber cleaver and advancing the flaw after the first step.

To achieve an objective of the present disclosure, an optical fiber cleaving method according to the present disclosure includes: a first step of creating a flaw in the optical fiber using the above-described optical fiber cleaver; and a third step of cleaving the optical fiber by drawing the optical fiber and advancing the flaw after the first step.

DESCRIPTION OF EMBODIMENTS

Figure 1:
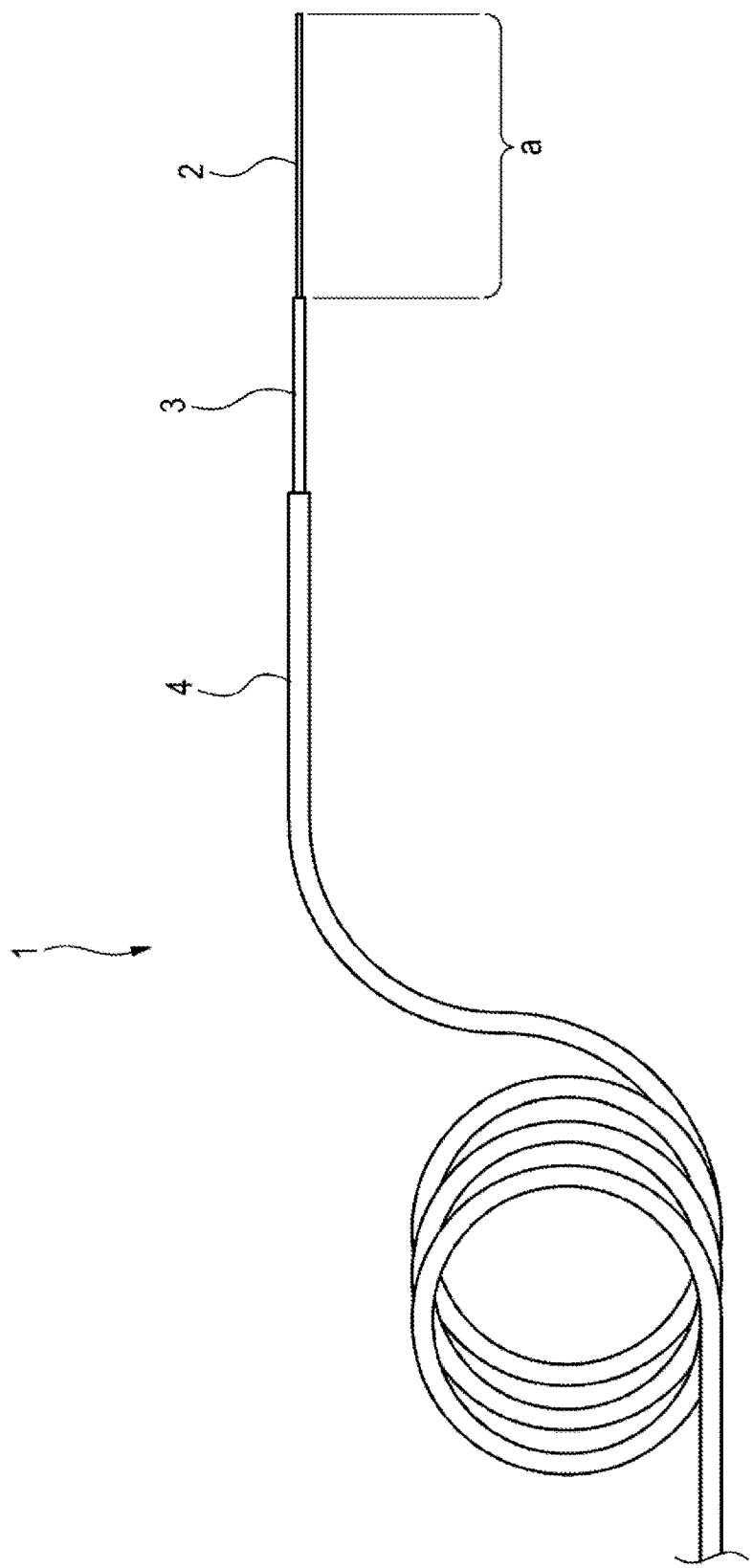
FIG. 1 is a diagram illustrating an example of an optical fiber for which an optical fiber cleaver is used according to an embodiment of the present specification.

Problem to be Solved by Present Disclosure

An optical fiber cleaving device disclosed in Patent Literature 1 includes a pair of upper and lower clamp members that grip a glass fiber portion in which a coating of an optical fiber is stripped, a disc-shaped blade member that moves a lower side of the glass fiber portion fixed by the clamp members and creates a flaw in an outer circumferential surface of the glass fiber portion, a support frame that rotatably supports the blade member, and a pillow member that is equipped to be liftable to the upper side of the glass fiber portion and takes a bending load to the upper surface of the glass fiber portion. After the glass fiber portion fixed by the clamp members has a flaw created by the blade member, a fracture surface is obtained by cleavage of the optical fiber by causing the pillow member to apply a bending load to the glass fiber portion.

Incidentally, with population of a fiber to the home (FTTH), to package an optical fiber cleaving device together with an optical fiber and transmit the optical fiber cleaving device, lower cost and further miniaturization of the optical fiber cleaving device is required.

An objective of the present disclosure is to provide an optical fiber cleaver that can be manufactured at low cost and can be miniaturized. An objective of the present disclosure is to provide an optical fiber cleaving method capable of creating a flaw in an optical fiber and fracturing the optical fiber in a simple configuration.

Advantageous Effects of Present Disclosure

According to the present disclosure, it is possible to provide the optical fiber cleaver that can be manufactured at low cost and can be miniaturized. According to the present disclosure, it is possible to provide the optical fiber cleaving method capable of creating a flaw in an optical fiber and fracturing the optical fiber in a simple configuration.

Description of Embodiments of Present Disclosure

First, content of embodiments of the present disclosure will be listed and described.

(1) An optical fiber cleaver according to an embodiment of the present disclosure includes: a body unit on which an optical fiber extending in a first direction is loaded; a lid unit that connected to the body unit to be rotatable and configured to be openable with respect to the body unit; a pair of retainers arranged to be separate from each other in the first direction and retain the optical fiber between the pair of retainers when the lid unit is closed with respect to the body unit; a blade member configured to come into contact with the optical fiber from one direction side of a second direction intersecting the first direction between the pair of retainers and create a flaw in the optical fiber; and a movement unit configured as a movement unit moving the blade member and configured to bring the blade member into contact with the optical fiber from the one direction side of the second direction and move the blade member to one direction side of a third direction intersecting the first and second directions.

In this configuration, by moving the blade member from the second direction to the third direction using the movement unit, it is possible to create a flaw in the optical fiber in the simple configuration. Therefore, it is possible to provide the optical fiber cleaver which can be manufactured at low cost and can be miniaturized.

(2) In the optical fiber cleaver according to (1), the movement unit may be provided to be movable with respect one of the body unit and the lid unit. At least one alignment groove may be formed in a surface of one of the movement unit and one of the body unit and the lid unit, the surface including the second and third directions. At least one protrusion which is able to engage with at least the one alignment groove may be provided in a surface of the other of the movement unit and the one of the body unit and the lid unit, the surface including the second direction and the third direction. The movement unit may be movable to the other direction side of the second direction along a shape of at least the one alignment groove and may be subsequently movable to the one direction side of the third direction in accordance with a user operation.

In this configuration, when a user operates the movement unit in the state in which the optical fiber is retained by the pair of retainers, it is possible to bring the blade member to the optical fiber to cleave in an appropriate direction.

(3) In the optical fiber cleaver according to (2), at least the one alignment groove may be formed in a shape in which the blade member is evacuated to the one direction side of the second direction when a movement amount of the blade member to the one direction side of the third direction exceeds a predetermined value.

In this configuration, it is possible to prevent the blade member from interfering in the optical fiber after a flaw is created in the optical fiber.

(4) In the optical fiber cleaver according to (3), at least the one alignment groove may be formed so that a middle of at least the one protrusion is located to be more away from the optical fiber in the second direction than both ends of the protrusion in a movement range.

In this configuration, it is not necessary to urge the movement unit using an elastic portion or the like to be described below and it is possible to prevent the blade member from interfering in the optical fiber after a flaw is created in the optical fiber in the simple configuration.

(5) In the optical fiber cleaver according to (3), a guide convex portion guiding at least the one protrusion in the second and third directions may be formed inside at least the one alignment groove.

In this configuration, by guiding the protrusion using the guide convex portion, it is possible to appropriately move the blade member in a desired direction.

(6) In the optical fiber cleaver according to any one of (1) to (5), the movement unit may be urged to the other direction side of the third direction by an elastic portion provided in one of the body unit and the lid unit.

In this configuration, when the user detaches the movement unit from his or her hand, it is possible to return the movement unit and the blade member to initial positions by an urging force of the elastic portion.

(7) In the optical fiber cleaver according to (6), the elastic portion may be disposed to be sloped with respect to the third direction and urge the movement unit in an orientation including an orientation component of the one direction side of the second direction and an orientation component of the other direction side of the third direction.

In this configuration, it is possible to reliably evacuate the blade member in a direction to be away from the optical fiber so that the blade member does not interfere in the optical fiber.

(8) In the optical fiber cleaver according to any one of (2) to (5), at least the one alignment groove may include a first alignment groove and a second alignment groove provided at a position different from the first alignment groove in at least one of the second and third directions, and at least the one protrusion includes a first protrusion provided at a position corresponding to the first alignment groove and a second protrusion provided at a position corresponding to the second alignment groove.

In this configuration, by providing the plurality of alignment grooves and the plurality of protrusions, it is possible to maintain the direction of the movement unit in the initial state and it is possible to reliably move the blade member in a predetermined direction.

(9) The optical fiber cleaver according to any one of (1) to (8) may further include a counter configured to count the number of cleaves of the optical fiber by the blade member; and a cleaving stop unit configured to restrict movement of the movement unit and stops cleaving the optical fiber when the number of cleaves is equal to or greater than a predetermined number of times.

In this configuration, when the number of cleaves of the optical fiber is equal to or greater than a given number, it is possible to prevent deterioration in cleaving quality of the optical fiber due to consumption of the blade member by stopping cleaving the optical fiber.

(10) In the optical fiber cleaver according to (9), the movement unit may be provided to movable with respect to the body unit. The movement unit may include a latch portion protruding in at least the first direction. The cleaving stop unit may be provided inside the body unit. The cleaving stop unit may include a gear portion engaging with the latch unit in response to the movement of the movement unit and moving in one direction, and a rotation movement unit moving the cleaving stop unit in the one direction of the second direction in response to the rotation of the gear portion. The rotation of the gear portion may be stopped to restrict the movement of the movement unit when the number of cleaves is equal to or greater than the predetermined number of times, to restrict the movement of the movement unit when the number of cleaves is equal to or greater than the predetermined number of times.

In this configuration, in a simple configuration in which the rotation of the gear portion is stopped when the number of cleaves of the optical fiber is equal to or greater than a given number, the movement of the movement unit can be restricted.

(11) In the optical fiber cleaver according to (10), the counter counting the number of cleaves of the optical fiber stepwise may be formed in the body unit. The number of cleaves may be displayable in accordance with a change in a positional relation between the counter and a tip end of the cleaving stop unit in response to movement of the cleaving stop unit in the one direction side of the second direction.

In this configuration, the user can easily ascertain a currently used number of times or a lifespan of the optical fiber cleaver.

(12) In the optical fiber cleaver according to any one of (1) to (11), a cleaving edge of the blade member may be in a straight shape.

In this configuration, it is possible to constantly maintain a depth of the flaw of the optical fiber.

(13) In the optical fiber cleaver according to any one of (1) to (12), the cleaving mechanism may be provided at a position facing the blade member and may include a pressing portion that presses the optical fiber from the other direction side of the second direction and bends the optical fiber flawed by the blade member to cleave the optical fiber.

In this configuration, by creating a flaw in the optical fiber using the blade member and subsequently pressing the optical fiber from the opposite side to the blade member using the pressing unit, it is possible to simply fracture the optical fiber.

(14) In the optical fiber cleaver according to any one of (1) to (13), a scrap accommodation portion capable of accommodating a scrap of the optical fiber after the cleaving may be provided at one end of the body unit in the first direction.

In this configuration, it is possible to reliably collect an optical fiber scrap after the cleaving.

(15) An optical fiber cleaving method according to an embodiment of the present disclosure includes: a first step of creating a flaw in an optical fiber using the optical fiber cleaver according to any one of (1) to (12); and a second step of cleaving the optical fiber by bending the optical fiber using the pressing unit according to (13) and advancing the flaw after the first step.

In this configuration, it is possible to simply create a flaw and fracture the optical fiber in the simple configuration.

(16) An optical fiber cleaving method according to an embodiment of the present disclosure includes: a first step of creating a flaw in the optical fiber using the optical fiber cleaver according to any one of (1) to (12); and a third step of cleaving the optical fiber by drawing the optical fiber and advancing the flaw after the first step.

In this configuration, it is possible to simply create a flaw and fracture the optical fiber in the simple configuration.

DETAILS OF EMBODIMENT OF PRESENT DISCLOSURE

Hereinafter, preferred embodiments of the present disclosure will be described with reference to the appended drawings. In description of the drawings, same reference signs are given to same or equivalent components and the description will not be repeated.

First, an optical fiber for which an optical fiber cleaver according to an embodiment of the present specification is used will be described. FIG. 1 is a diagram illustrating an example of an optical fiber for which an optical fiber cleaver is used according to an embodiment of the present specification.

An optical fiber 1 includes a glass fiber 2 that includes a core and a clad wrapping the core, an insulating layer 3 that wraps the glass fiber 2, and a jacket 4 that wraps the insulating layer 3. In the optical fiber 1, the jacket 4 and the insulating layer 3 are removed step by step in a tip end a and the glass fiber 2 is exposed. The optical fiber 1 is cleaved using an optical fiber cleaver 100 to be described below at the tip end a at which the glass fiber 2 is exposed.

First Embodiment

Figure 2:
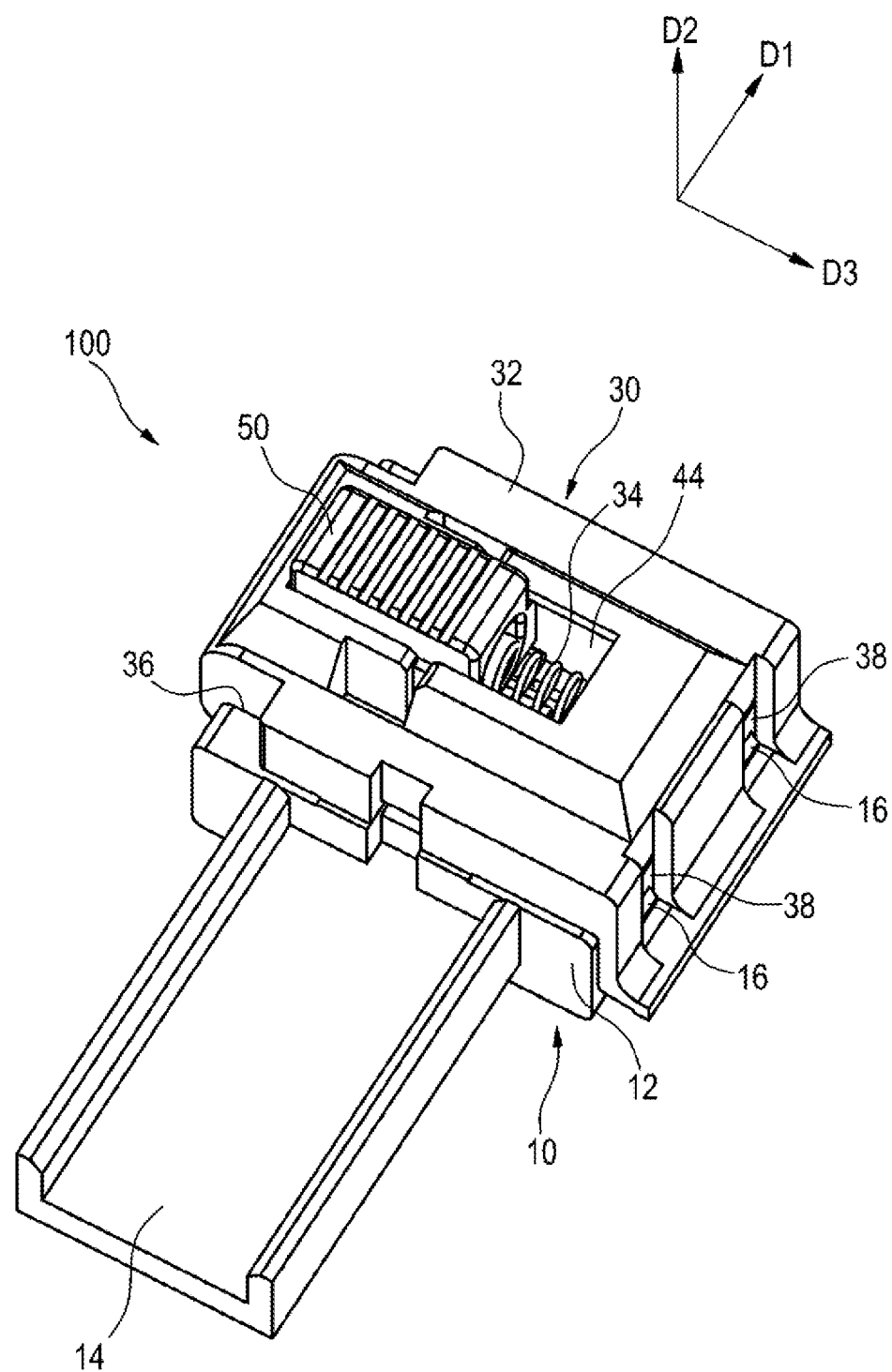
FIG. 2 is a front perspective view illustrating an optical fiber cleaver according to a first embodiment.
Figure 3:
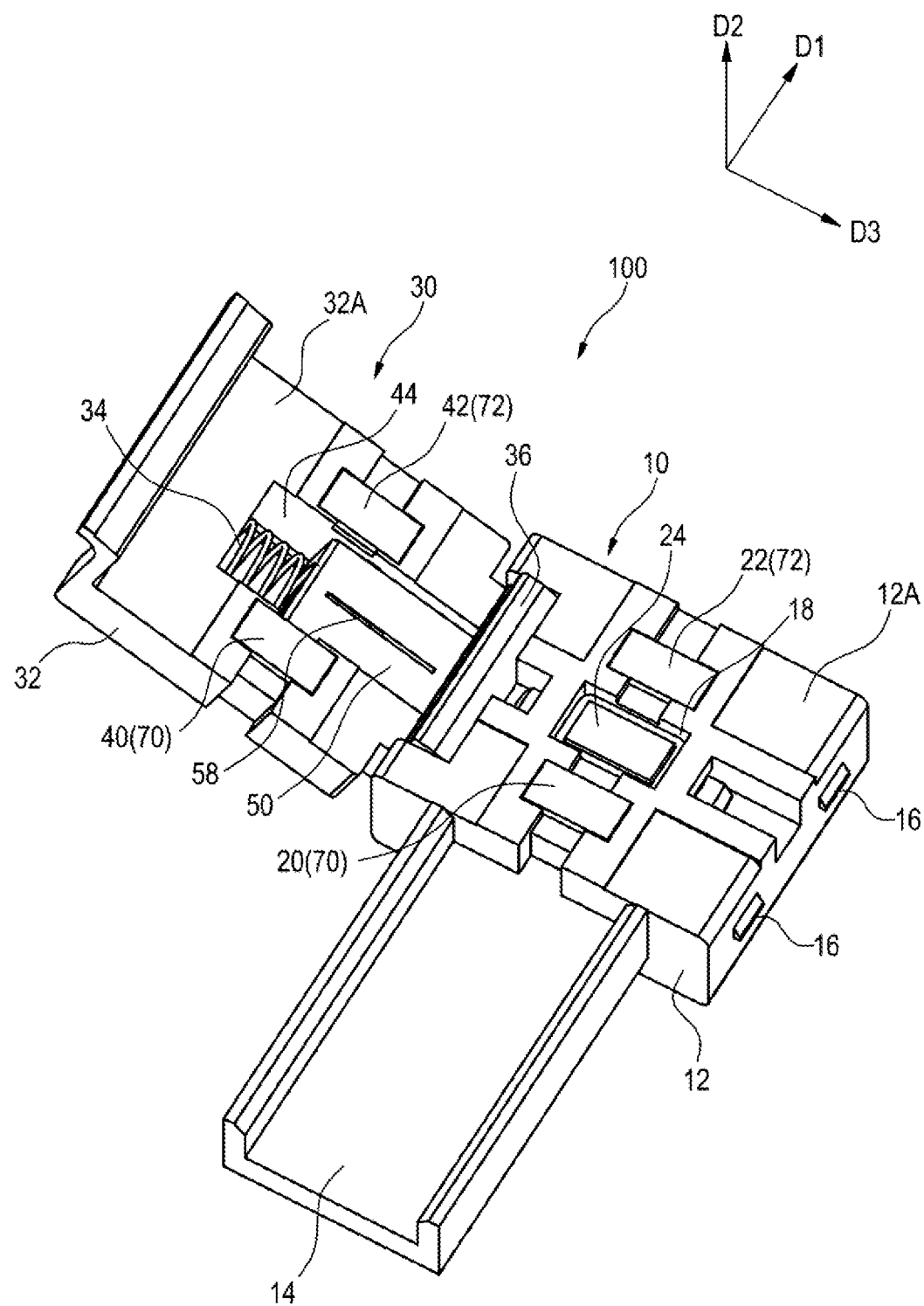
FIG. 3 is a front perspective view illustrating a state in which a lid unit of the optical fiber cleaver in FIG. 2 is opened.
Figure 4:
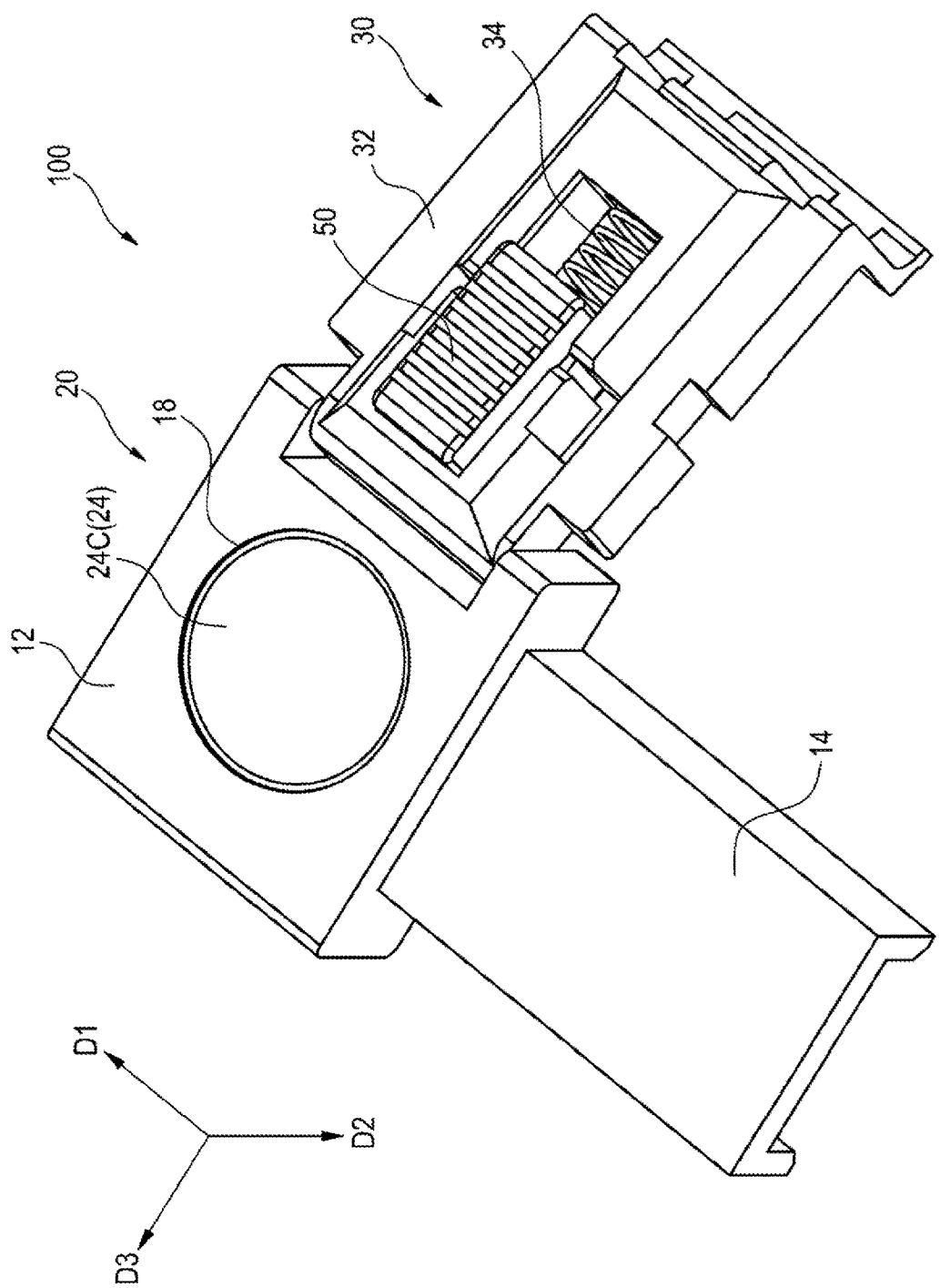
FIG. 4 is a rear perspective view illustrating the optical fiber cleaver in the state of FIG. 3.
Figure 5:
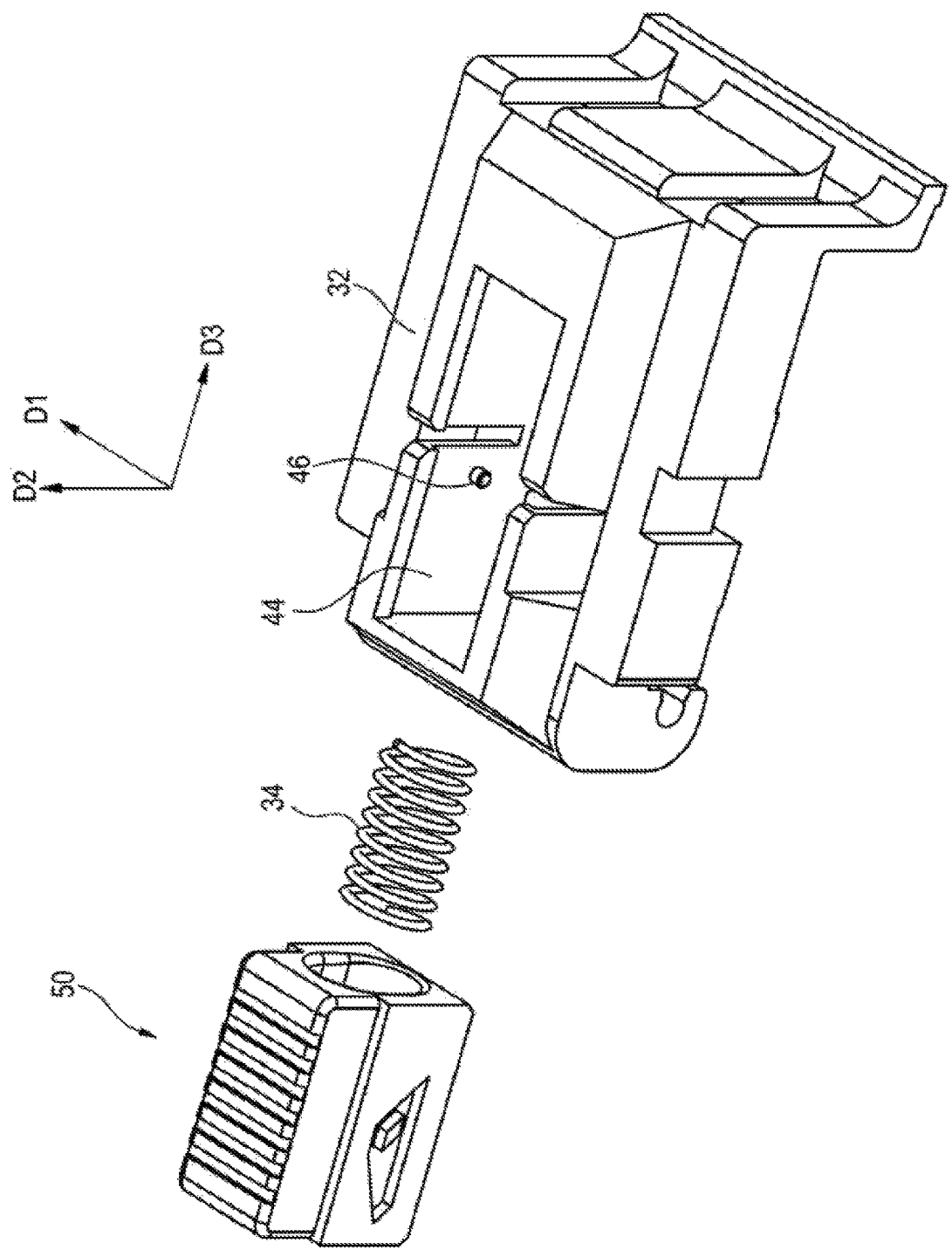
FIG. 5 is an exploded perspective view illustrating the lid unit including a slider.

Next, the optical fiber cleaver 100 according to a first embodiment will be described with reference to FIGS. 2 to 6 and the like. FIG. 2 is a front perspective view illustrating the optical fiber cleaver 100 according to the first embodiment. FIG. 3 is a front perspective view illustrating a state in which a lid unit 30 of the optical fiber cleaver 100 is opened. FIG. 4 is a rear perspective view illustrating the optical fiber cleaver 100 in the state of FIG. 3. FIG. 5 is an exploded perspective view illustrating the lid unit 30.

In the following description, in a state illustrated in FIG. 2, a longitudinal direction of the optical fiber cleaver 100 (a body unit 10) is referred to as a first direction D1, a transverse direction of the optical fiber cleaver 100 is referred to as a second direction D2, and a thickness direction of the optical fiber cleaver 100 is referred to as a third direction D3. One direction side (an arrow side) of the second direction D2 is an upper and the other direction side of the second direction D2 is referred to as a lower side in some cases.

As illustrated in FIGS. 2 to 4, the optical fiber cleaver 100 includes the body unit 10 and the lid unit 30 connected to the body unit 10 to be openable.

The body unit 10 includes a support stand 12, a rail 14, a pair of body unit side retainers 20 and 22, and a pressing unit 24 (an example of a cleaving mechanism).

The rail 14 extends in the first direction D1 from one side of a surface including the second direction D2 and the third direction D3 of the support stand 12. A holder 160 holding the optical fiber 1 is loaded on the rail 14 (see FIG. 7).

The support stand 12 includes two engagement protrusions 16 that protrude toward the outside on one side of the surface including the first direction D1 and the second direction D2. The engagement protrusions 16 engage with engagement holes 38 of the lid unit 30 to be described below and are used to keep a state in which the lid unit 30 is closed with respect to the body unit 10. In the middle of the support stand 12, an opening 18 penetrated through the support stand 12 is formed in the second direction D2.

The pair of body unit side retainers 20 and 22 are provided on a surface 12A facing the lid unit 30 in the surface of the support band 12 including the first direction D1 and the third direction D3. The pair of body unit side retainers 20 and 22 are arranged to be separate from each other in the first direction D1. The body unit side retainers 20 and 22 are formed of, for example, a flat rubber plate, fluorine-based resin plate, or acrylic plate and are attached to the surface 12A.

Figure 9:
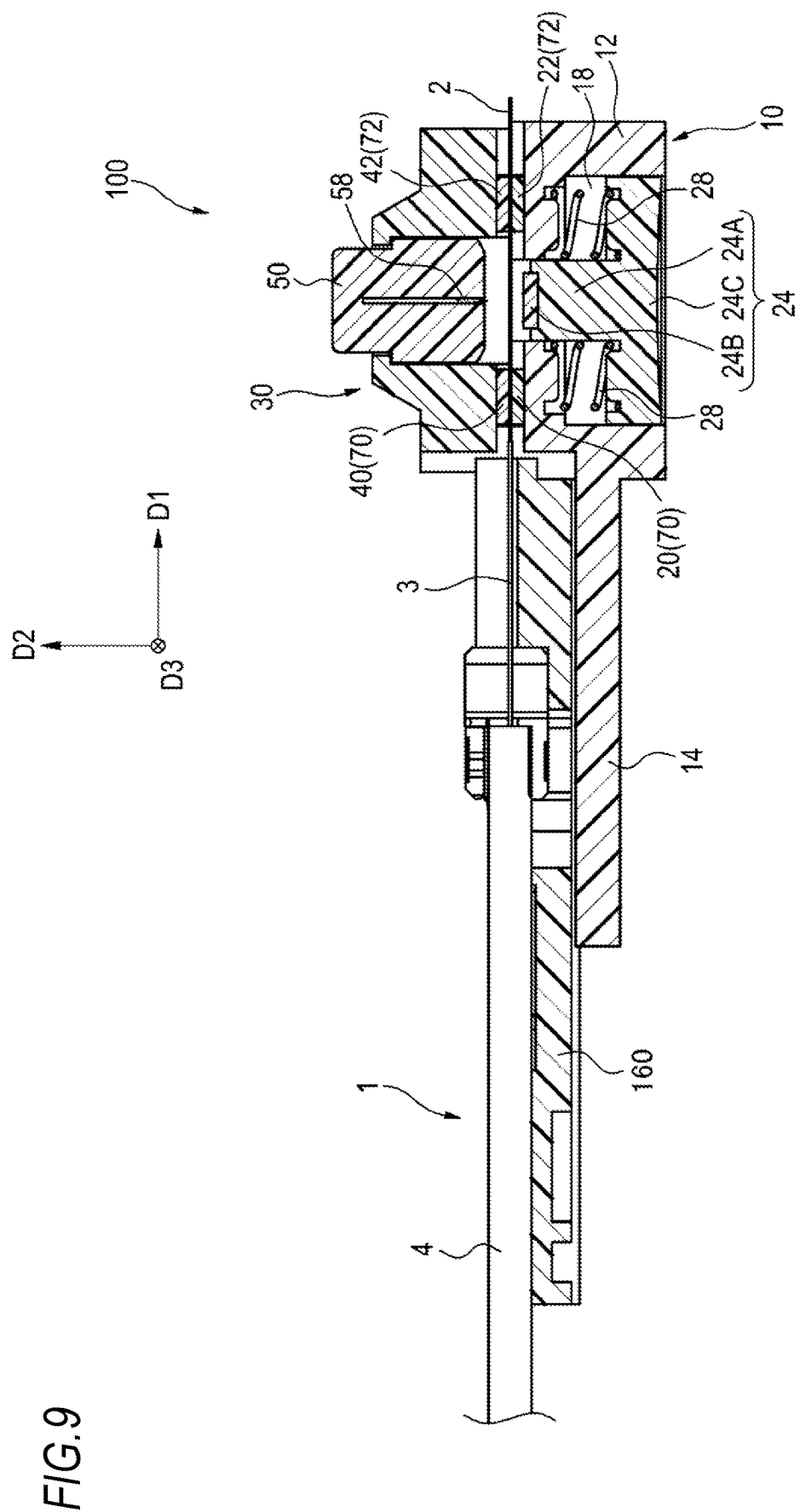
FIG. 9 is a sectional view taken along the line B-B of FIG. 8.
Figure 10:
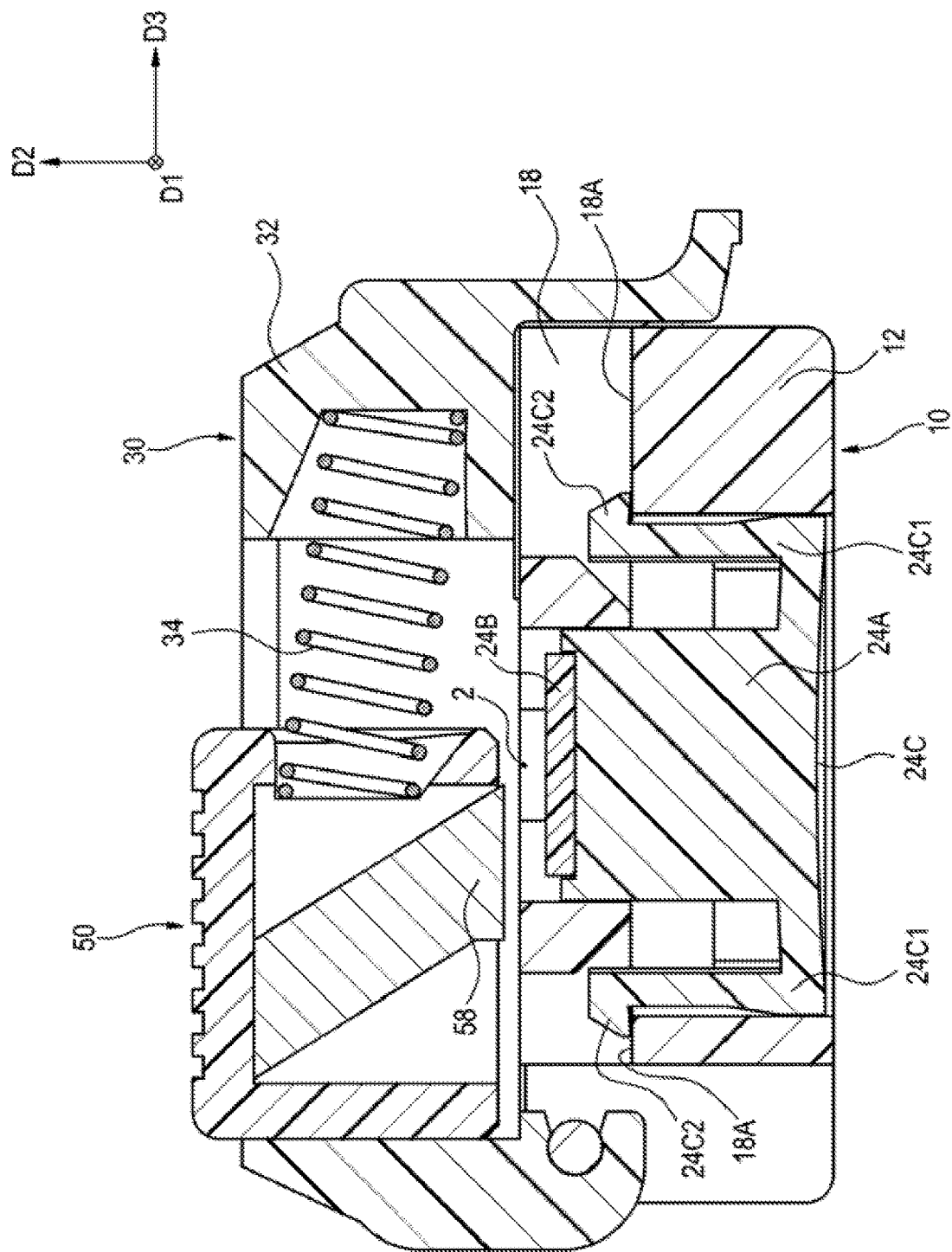
FIG. 10 is a sectional view taken along the line C-C of FIG. 8.

The pressing unit 24 is accommodated inside the opening 18 formed between the pair of body unit side retainers 20 and 22. The pressing unit 24 includes a base portion 24A, a contact portion 24B, and a pressing button 24C, as illustrated in FIGS. 9 and 10 and the like. The contact portion 24B is disposed at an end of a side (the side of the surface 12A) of the base portion 24A facing the lid unit 30. The contact portion 24B is formed of a flat rubber plate, fluorine-based resin plate, or acrylic plate and is attached to the base portion 24A, as in the body unit side retainers 20 and 22. The pressing button 24C is provided to be integrated with the base portion 24A on the opposite side to the side on which the contact portion 24B is attached. As illustrated in FIG. 4, the pressing button 24C is disposed to face the outside of the support stand 12 from the opening 18. As illustrated in FIG. 10, curved portions 24C1 curved on the contact portion 24B are formed in the second direction D2 on both ends of the pressing button 24C in the first direction D1. Claws 24C2 are formed at the tip ends of the curved portions 24C1. The claws 24C2 engage with stepped portions 18A inside the opening 18 to regulate movement of the pressing button 24C in the second direction D2. The pressing button 24C is urged to the other direction side (the lower side) of the second direction D2 by a spring 28 (see FIG. 9). Thus, the pressing button 24C can be moved to the one direction side (the upper side) of the second direction D2 against an urging force of the spring 28 by a user operation.

As illustrated in FIGS. 3 to 5, the lid unit 30 includes a lid unit body 32, a spring 34, and a slider 50 supporting a cutter 58.

The lid unit body 32 includes a connection portion 36, the engagement holes 38, and a pair of lid unit side retainers 40 and 42. The connection portion 36 is provided at one end of the lid unit body 32 in the third direction D3. The lid unit body 32 is connected to the support stand 12 by the connection portion 36 to be rotatable. The engagement holes 38 are formed at the other end of the lid unit body 32 in the third direction D3. When the engagement holes 38 engage with the engagement protrusions 16 formed in the support stand 12, the lid unit body 32 can be retained in a state in which the lid unit body 32 is closed with respect to the support stand 12. The pair of lid unit side retainers 40 and 42 are provided on a surface 32A facing the body unit 10 in the surface of the lid unit body 32 including the first direction D1 and the third direction D3. The pair of lid unit side retainers 40 and 42 are arranged at positions corresponding to the pair of body unit side retainers 20 and 22 to be separated from each other in the first direction D1. For example, the pair of lid unit side retainers 40 and 42 are formed of a flat rubber plate, fluorine-based resin plate, or acrylic plate and are attached to the base 32A, as in the body unit side retainers 20 and 22.

In the middle of the lid unit body 32, a horizontally long rectangular opening 44 penetrated through the lid unit body 32 in the second direction D2 is formed. A protrusion 46 protruding inside the opening 44 in the first direction D1 is formed on the surface including the second direction D2 and the third direction D3 in a surface forming the opening 44 (see FIG. 5). Only one protrusion 46 is illustrated in FIG. 5, but a protrusion protruding inside the opening 44 is also formed in the first direction D1 in this way on a side facing the protrusion 46.

The slider 50 is a member that moves the cutter 58 to be described below toward one direction side (an arrow side) of the third direction D3. The slider 50 accommodated inside the opening 44 is urged toward the other direction side of the third direction D3 by the spring 34. The detailed structure of the slider 50 will be described later.

A pair of retainers 70 and 72 are formed by the pair of boy unit side retainers 20 and 22 provided in the body unit 10 and the pair of lid unit side retainers 40 and 42 provided in the lid unit 30. The pair of retainers 70 and 72 retain the optical fiber 1 so that a portion in which the glass fiber 2 of the optical fiber 1 is exposed extends between the pair of retainers 70 and 72 in a state in which the engagement protrusions 16 of the body unit 10 engage with the engagement holes 38 of the lid unit 30. Specifically, the retainer 70 (the body unit side retainer 20 and the lid unit side retainer 40) holds a portion in which the insulating layer 3 is exposed from the jacket 4 of the optical fiber 1 and the retainer 72 (the body unit side retainer 22 and the lid unit side retainer 42) holds a portion (the tip end a illustrated in FIG. 1) in which the glass fiber 2 is exposed from the insulating layer 3 of the optical fiber 1.

Figure 6A:
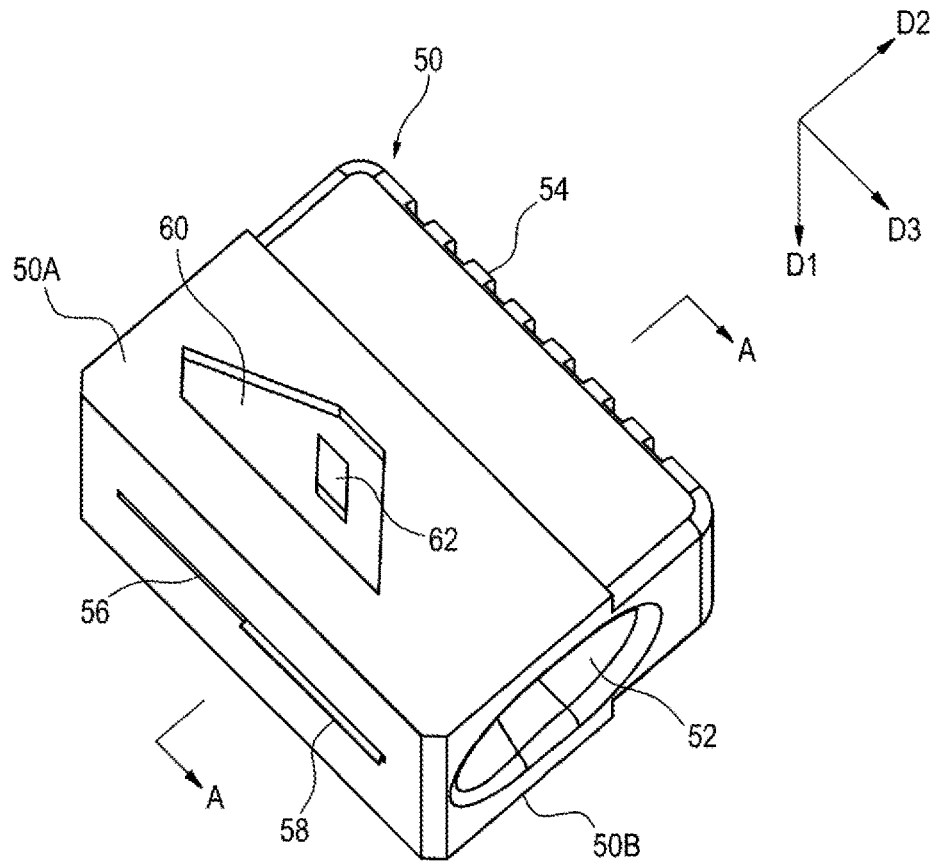
FIG. 6A is a perspective view illustrating the slider including a blade member.
Figure 6B:
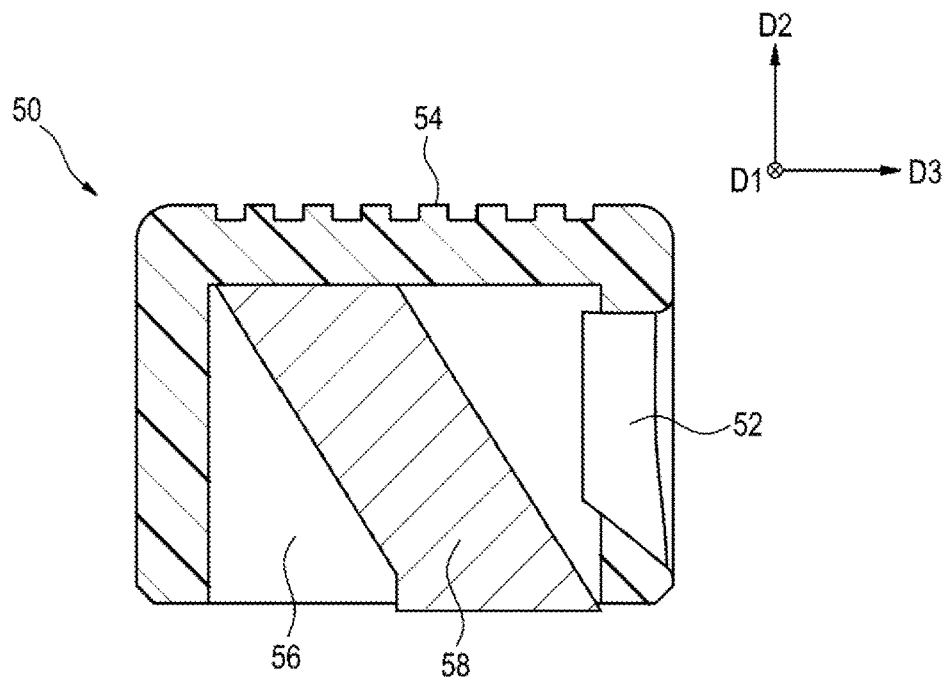
FIG. 6B is a sectional view taken along the line A-A of FIG. 6A.

Next, a structure of the slider 50 will be described with reference to FIGS. 6A and 6B. FIG. 6A is a perspective view illustrating the slider 50 and FIG. 6B is a sectional view taken along the line A-A of FIG. 6A.

As illustrated in FIG. 6A, the slider 50 forms a rectangular parallelepiped shape that extends in a longitudinal direction in the third direction D3. A spring bearing 52 is formed on one side of the surface of the slider 50 including the first direction D1 and the second direction D2. The slider 50 accommodated in the opening 44 of the lid unit body 32 is urged to the other direction side of the third direction D3 by the spring 34 in the spring bearing 52. An uneven slide operation portion 54 is formed on one side of the surface (the surface opposite to the face facing the body unit 10) of the slider 50 including the first direction D1 and the third direction D3. When a user brings his or her finger into contact with the slide operation portion 54 to operate the slider 50, the slider 50 can be moved toward the one direction side of the third direction D3.

A slit 56 extending in the third direction D3 is formed on the other side of the surface (the face facing the body unit 10) of the slider 50 including the first direction D1 and the third direction D3. As illustrated in FIG. 6B, the cutter 58 (an example of a blade member) is accommodated inside the slit 56. The cutter 58 is formed of, for example, a metal (steel or the like). A cleaving edge at the tip end of the cutter 58 is formed in a straight shape and protrudes outside in the second direction D2 from the slit 56. In this way, the slider 50 supports the cutter 58 to be movable in the third direction D3.

Alignment grooves 60 are formed in surfaces 50A and 50B of the slider 50 including the second direction D2 and the third direction D3. The alignment grooves 60 are formed in both the surfaces 50A and 50B of the slider 50. Hereinafter, the alignment groove 60 formed in the surface 50A illustrated in FIG. 6A will be described representatively. The alignment groove 60 is formed in, for example, a substantially triangular shape. Specifically, the alignment groove 60 has a shape in which, a vertex on one direction side of the second direction D2 and a vertex on the other direction side of the third direction D3 are notched among three vertexes of the triangular shape. In a state in which the slider 50 is accommodated in the opening 44 of the lid unit body 32, the protrusion 46 protruding from the opening 44 engages with the alignment groove 60. A guide convex portion 62 that has a substantially trapezoidal shape and guides the protrusion 46 in a predetermined direction is formed inside the alignment groove 60.

Next, an operation of the optical fiber cleaver 100 will be described. FIGS. 7 to 17 are diagrams illustrating an operation of the optical fiber cleaver 100 illustrated in FIG. 2 and the like. FIGS. 11A to 11E are schematic diagrams illustrating a movable direction of the slider 50.

Figure 7:
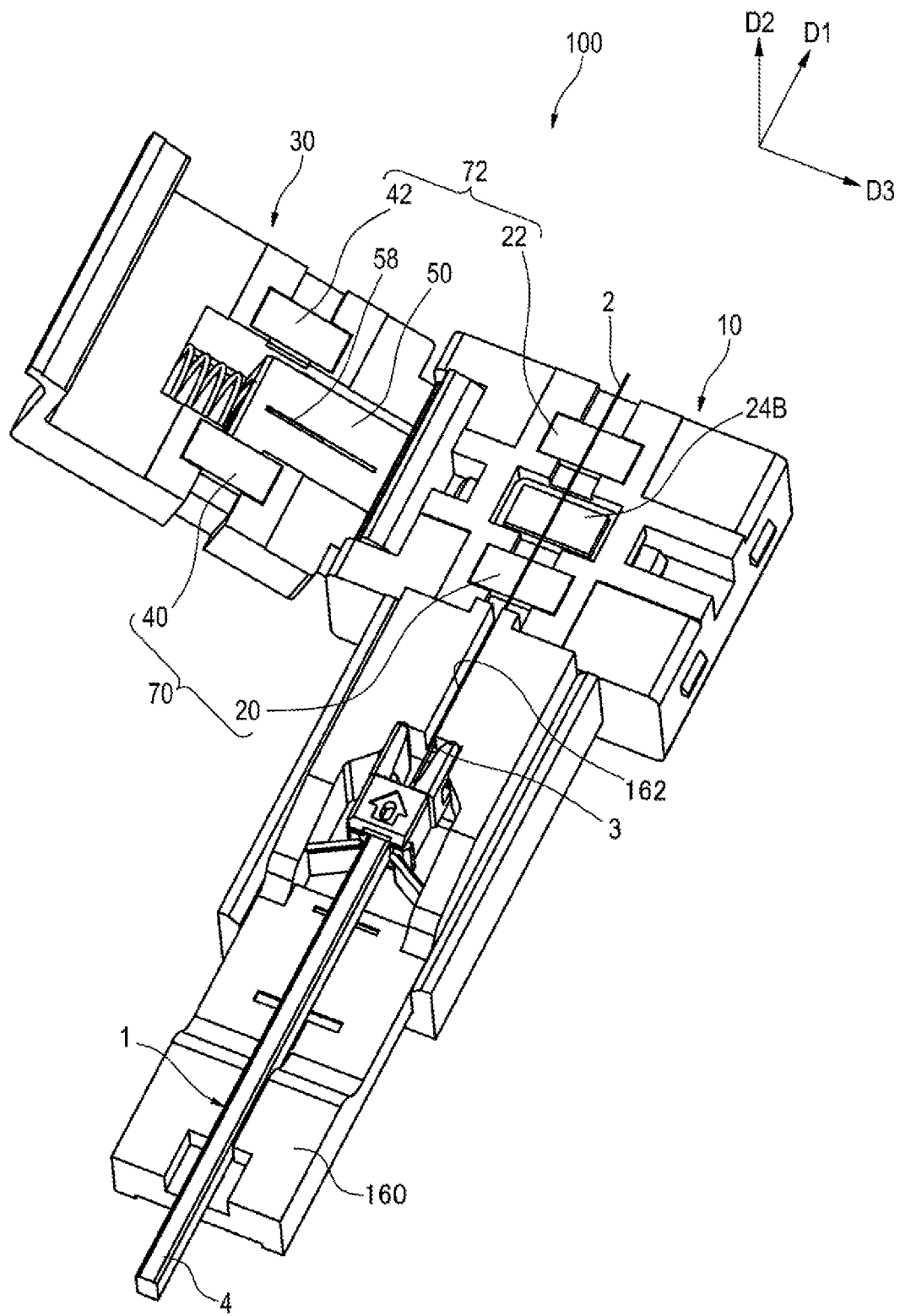
FIG. 7 is a diagram illustrating an operation of the optical fiber cleaver when an optical fiber held in a holder is cleaved.

First, as illustrated in FIG. 7, the user opens the lid unit 30 of the optical fiber cleaver 100 with respect to the body unit 10 and then loads the holder 160 holding the optical fiber 1 on the rail 14. A V groove 162 is formed at one end of the holder 160 in the longitudinal direction (the first direction D1 in FIG. 7). The glass fiber 2 with the insulating layer 3 of a portion exposed from the jacket 4 is inserted into the V groove 162. By bringing the end of the V groove 162 of the holder 160 into contact with the boundary between the rail 14 and the support stand 12, the optical fiber 1 is positioned in the optical fiber cleaver 100. In this state, a portion of the optical fiber 1 protruding from the holder 160 (a tip end of the glass fiber 2 exposed from the insulating layer 3) extends between the pair of body unit side retainers 20 and 22.

Figure 8:
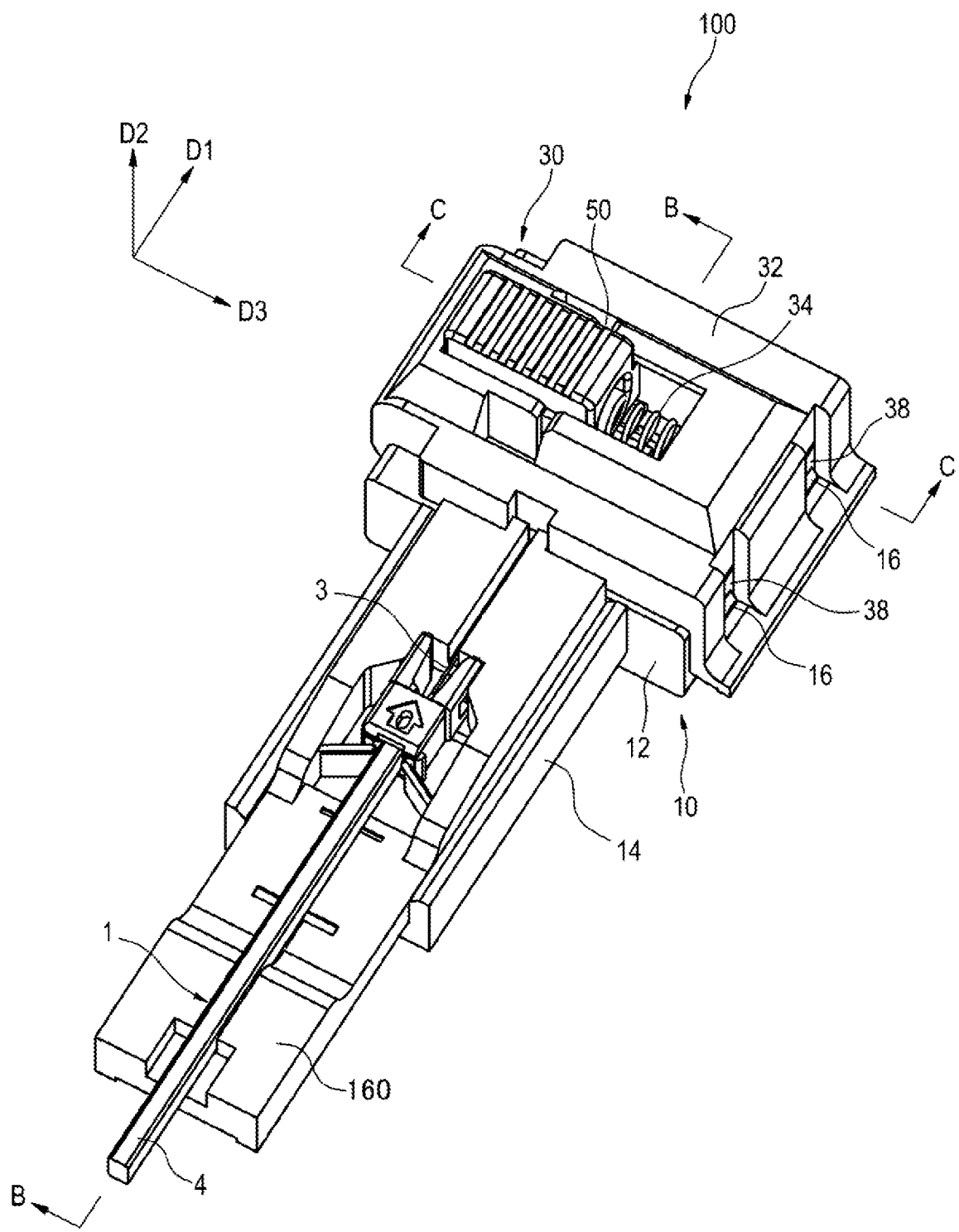
FIG. 8 is a diagram illustrating an operation of the optical fiber cleaver after the operation of FIG. 7.

Subsequently, as illustrated in FIG. 8, the user opens the lid unit 30 of the optical fiber cleaver 100 with respect to the body unit 10 and engages the engagement protrusions 16 formed in the support stand 12 with the engagement holes 38 formed in the lid unit body 32. Thus, as illustrated in FIG. 9, the glass fiber 2 of the optical fiber 1 is retained by the pair of retainers 70 and 72 (the pair of body unit side retainers 20 and 22 and the pair of lid unit side retainers 40 and 42). In this state, as illustrated in FIG. 10, the spring 34 is disposed to be sloped with respect to the third direction D3. That is, the spring 34 urges the slider 50 in an orientation including an orientation component of the one direction side of the second direction D2 and an orientation component of the other direction side of the third direction D3. In this way, in the state of FIG. 8, the cleaver 50 supported by the slider 50 is at a position separate from the glass fiber 2 in the second direction D2 and the third direction D3 (see FIG. 11A).

Figure 11A:
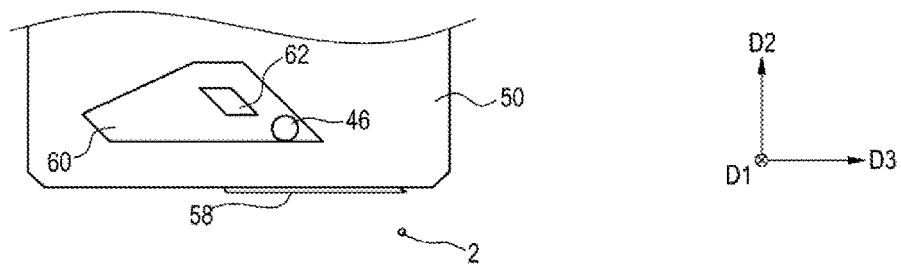
FIGS. 11A to 11E are schematic diagrams illustrating a movable direction of the slider.
Figure 11B:
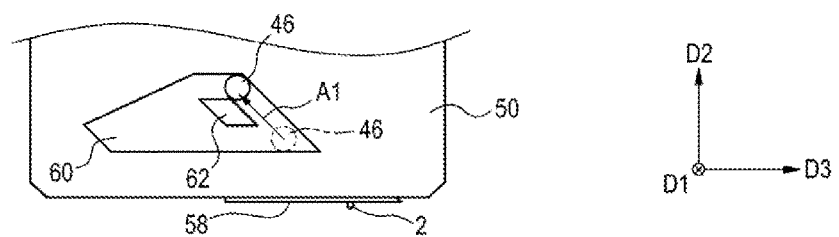
Figure 11C:
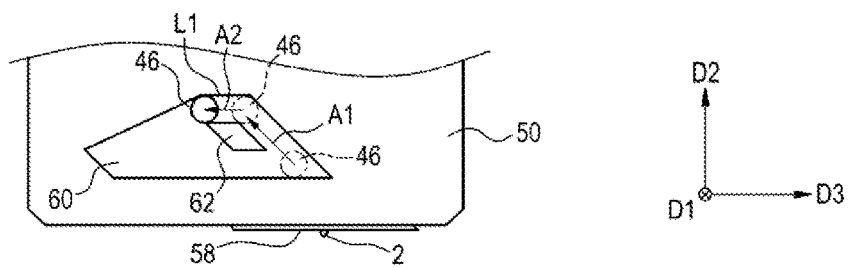
Figure 12:
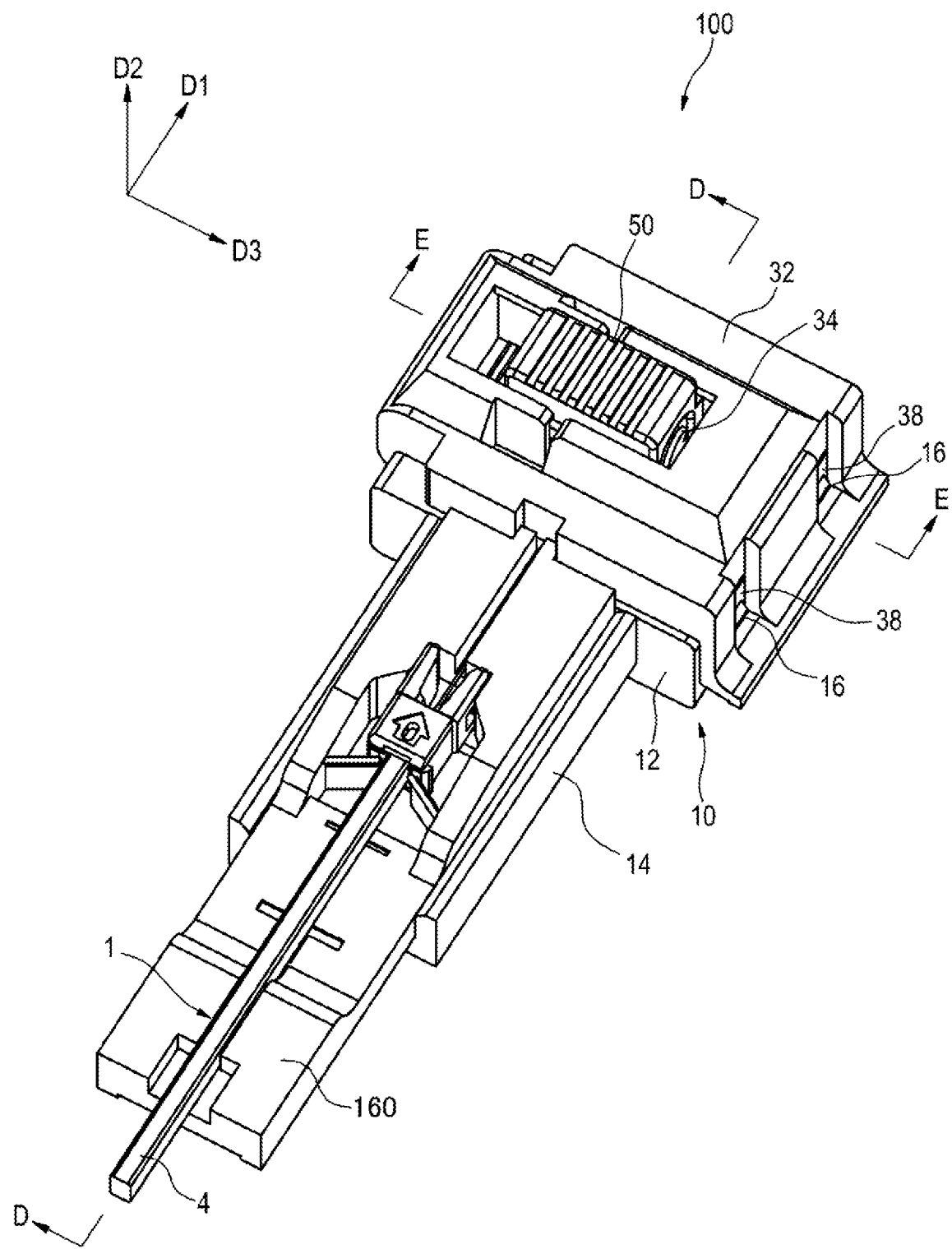
FIG. 12 is a diagram illustrating an operation of the optical fiber cleaver after the operation of FIG. 8.
Figure 13:
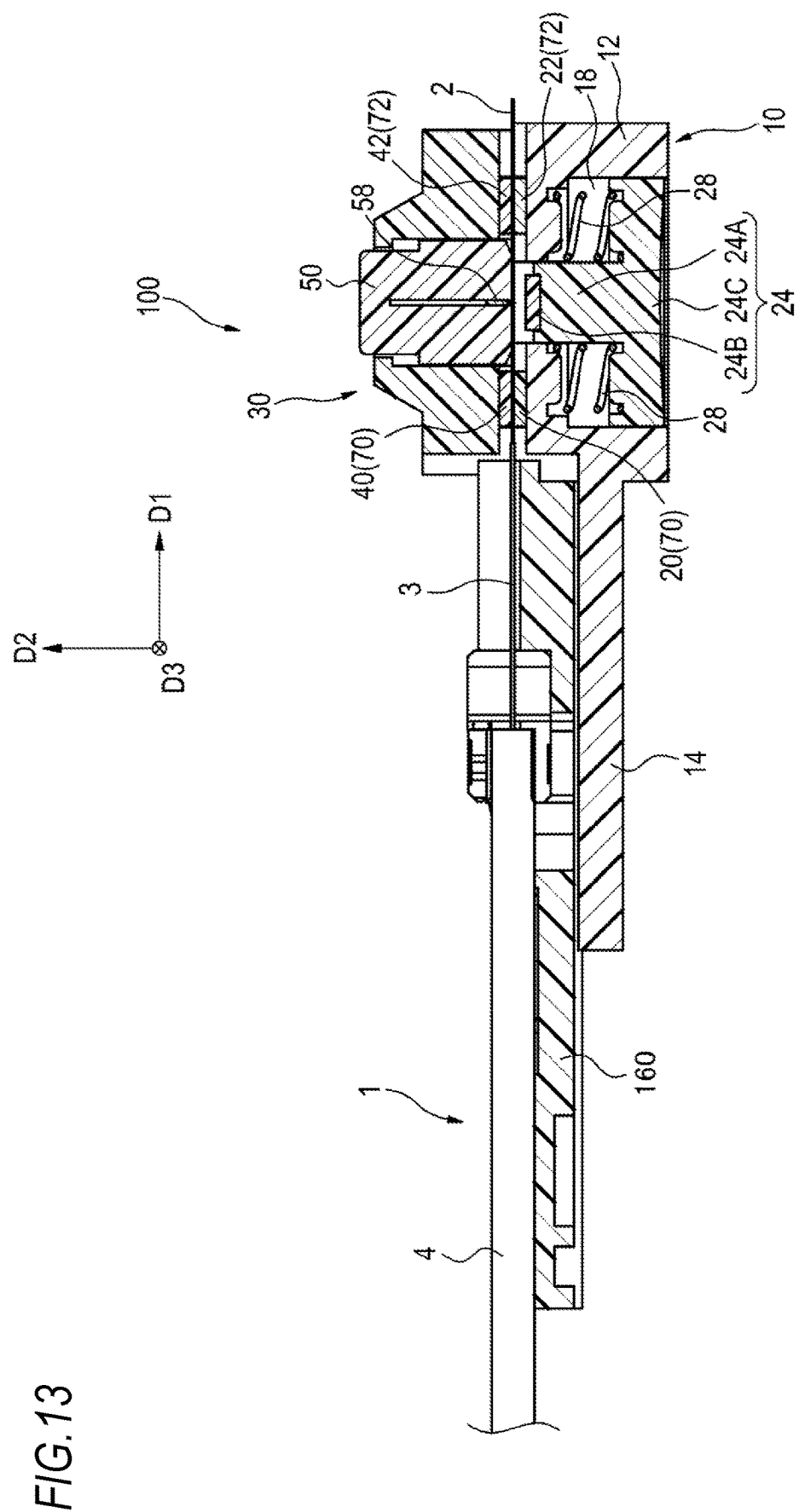
FIG. 13 is a sectional view taken along the line D-D of FIG. 12.
Figure 14:
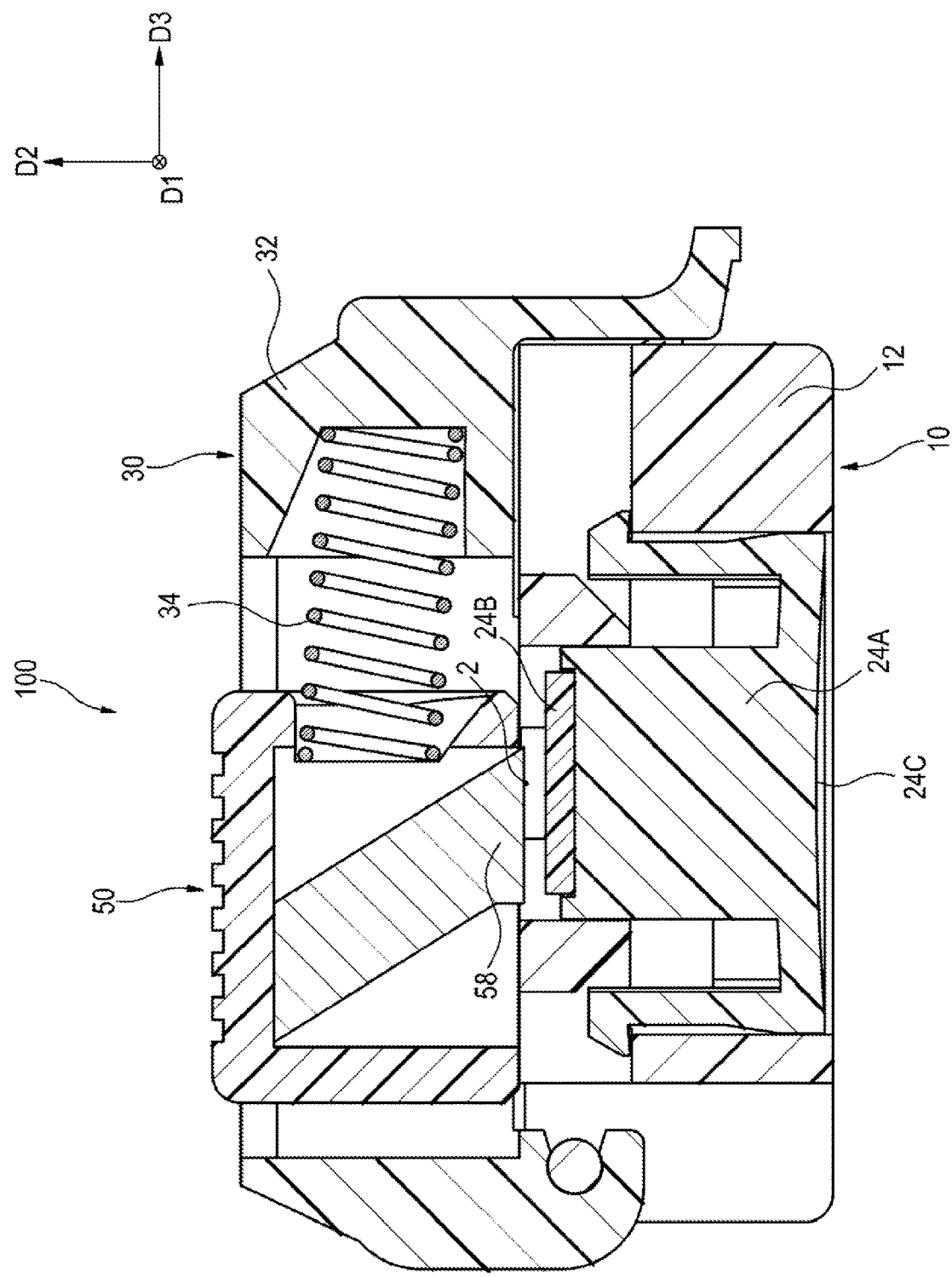
FIG. 14 is a sectional view taken along the line E-E of FIG. 12.

Subsequently, as illustrated in FIG. 12, the user moves the slider 50 in the one direction side of the third direction D3 against the urging force of the spring 34. At this time, as illustrated in FIGS. 11B and 11C, the protrusion 46 engaging with the alignment groove 60 is moved along a passage formed by the alignment groove 60 and the guide convex portion 62 so that the slider 50 is moved in a predetermined direction (that is, movement is regulated except for the predetermined direction). Specifically, when a force of the user moving the slider 50 to the one direction side of the third direction D3 is added to the slider 50, as illustrated in FIG. 11B, the slider 50 is first moved so that the protrusion 46 is moved in a direction A1 inside the alignment groove 60. Thus, as illustrated in FIGS. 13 and 14, the cutter 58 supported by the slider 50 comes into contact with the glass fiber 2 from the one direction side of the second direction D2.

Subsequently, when a force of the user moving the slider 50 to the one direction side of the third direction D3 is added to the slider 50, as illustrated in FIG. 11C, the slider 50 is moved so that the protrusion 46 is moved in a direction A2 inside the alignment groove 60. Thus, the cutter 58 coming into contact with the glass fiber 2 from the one direction side of the second direction D2 is moved to the one direction side of the third direction D3 in the state in which the cutter 58 is in contact with the glass fiber 2. In this example, of three vertexes of the triangular shape of the alignment groove 60, the vertex on the one direction side of the second direction D2 is notched along a side L1 in the third direction D3. Thus, in a state in which the cutter 58 is in contact with the glass fiber 2, the slider 50 is moved in the third direction D3 by the length of the side L1. In this way, the glass fiber 2 is flawed by the cutter 58 (an example of a first step).

Figure 11D:
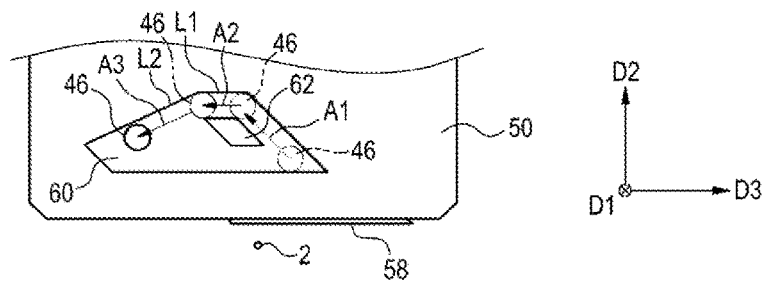

Subsequently, when a force of the user moving the slider 50 to the one direction side of the third direction D3 is further added to the slider 50, as illustrated in FIG. 11D, the slider 50 is moved so that the protrusion 46 is moved in a direction A3 inside the alignment groove 60. That is, when the protrusion 46 is butted to one end of the side L1, the slider 50 is moved so that the protrusion 46 follows the side L2 formed to be curved from the one end of the side L1 to the other direction side of the second direction D2. Thus, the cutter 58 supported by the slider 50 is moved to the one direction side of the second direction D2. That is, the cutter 58 is evacuated to the one direction side of the second direction D2 with respect to the glass fiber 2. In this way, the alignment groove 60 is preferably formed in a shape in which the cutter 58 is evacuated to the one direction side of the second direction D2 when a movement amount of the cutter 58 to the one direction side of the third direction D3 exceeds a predetermined value (the length of the side L1).

Figure 11E:
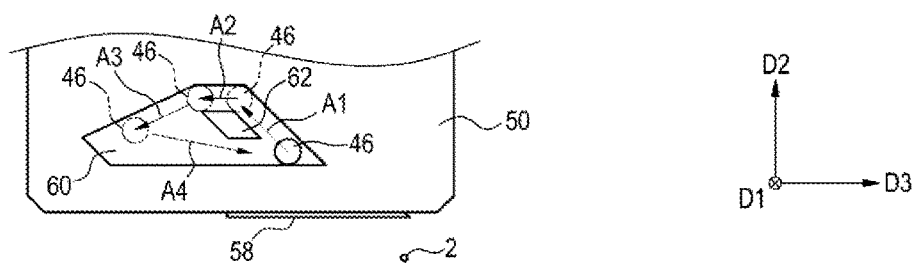

Subsequently, When the slider 50 is moved to the end of the opening 44 on the one direction side of the third direction D3 by the user and the user detaches the slider 50 from his or her finger, as illustrated in FIG. 11E, the slider 50 is moved so that the protrusion 46 is moved in the direction A4 within the alignment groove 60. This is because the slider 50 is urged in an orientation including an orientation component of the one direction side of the second direction D2 and an orientation component of the other direction side of the third direction D3 by the spring 34. Thus, the slider 50 and the cutter 58 return to the initial position illustrated in FIG. 11A.

Figure 15:
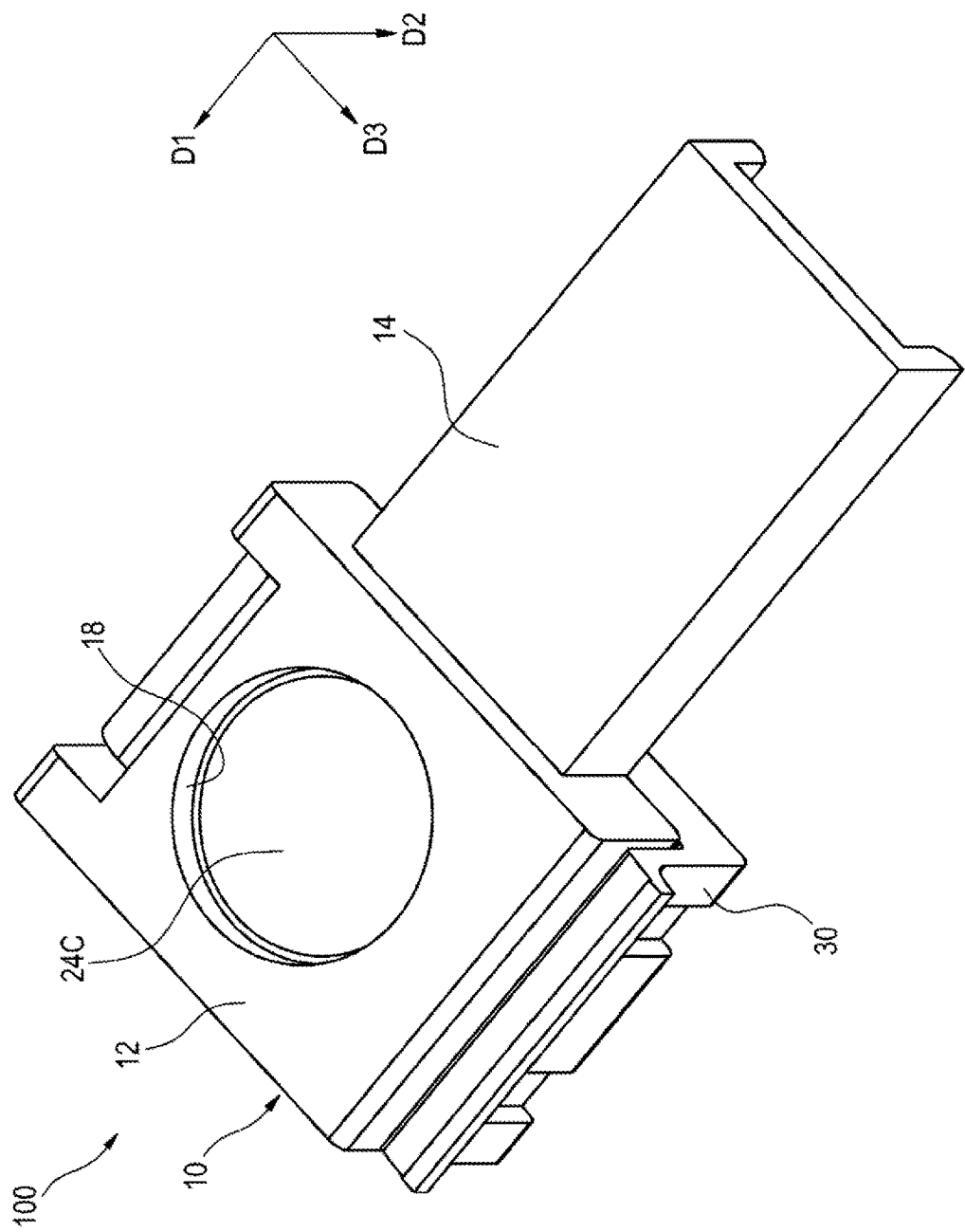
FIG. 15 is a diagram illustrating an operation of the optical fiber cleaver after the operation of FIG. 12.

Subsequently, as illustrated in FIG. 15, the user presses the pressing button 24C provided on the lower side of the support stand 12 of the body unit 10 from the other direction side of the second direction D2. In FIG. 15, the holder 160 holding the optical fiber 1 is not illustrated.

Figure 16:
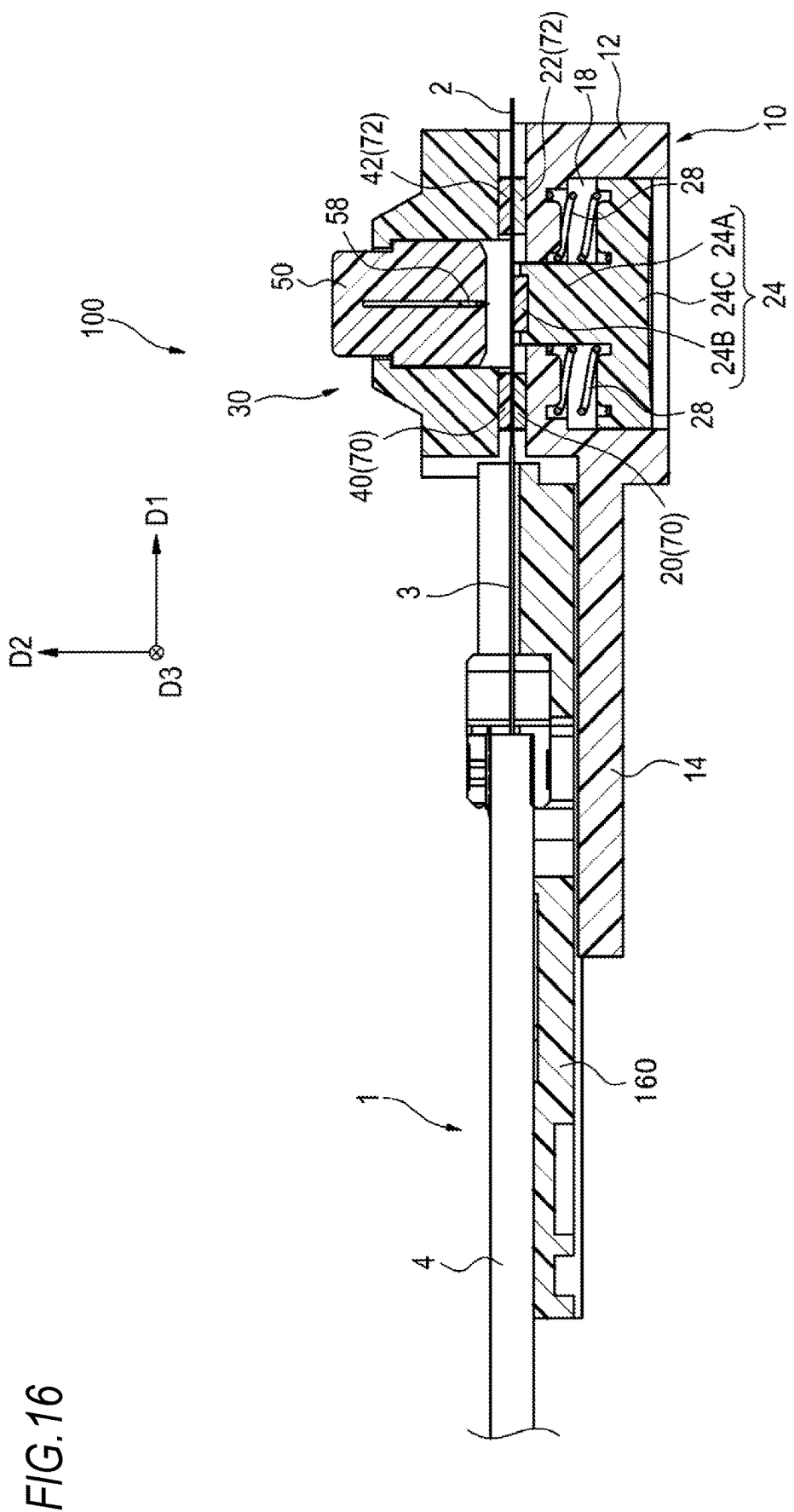
FIG. 16 is a longitudinal sectional view illustrating the optical fiber cleaver in a state in which an optical fiber is held in FIG. 15.

Thus, as illustrated in FIG. 16, the contact portion 24B of the pressing unit 24 presses the glass fiber 2 of a portion flawed by the cutter 58 to the one direction side of the second direction D2. In this way, the flaw of the glass fiber 2 is advanced and the glass fiber 2 is cleaved by bending the glass fiber 2 (an example of a second step).

Figure 17:
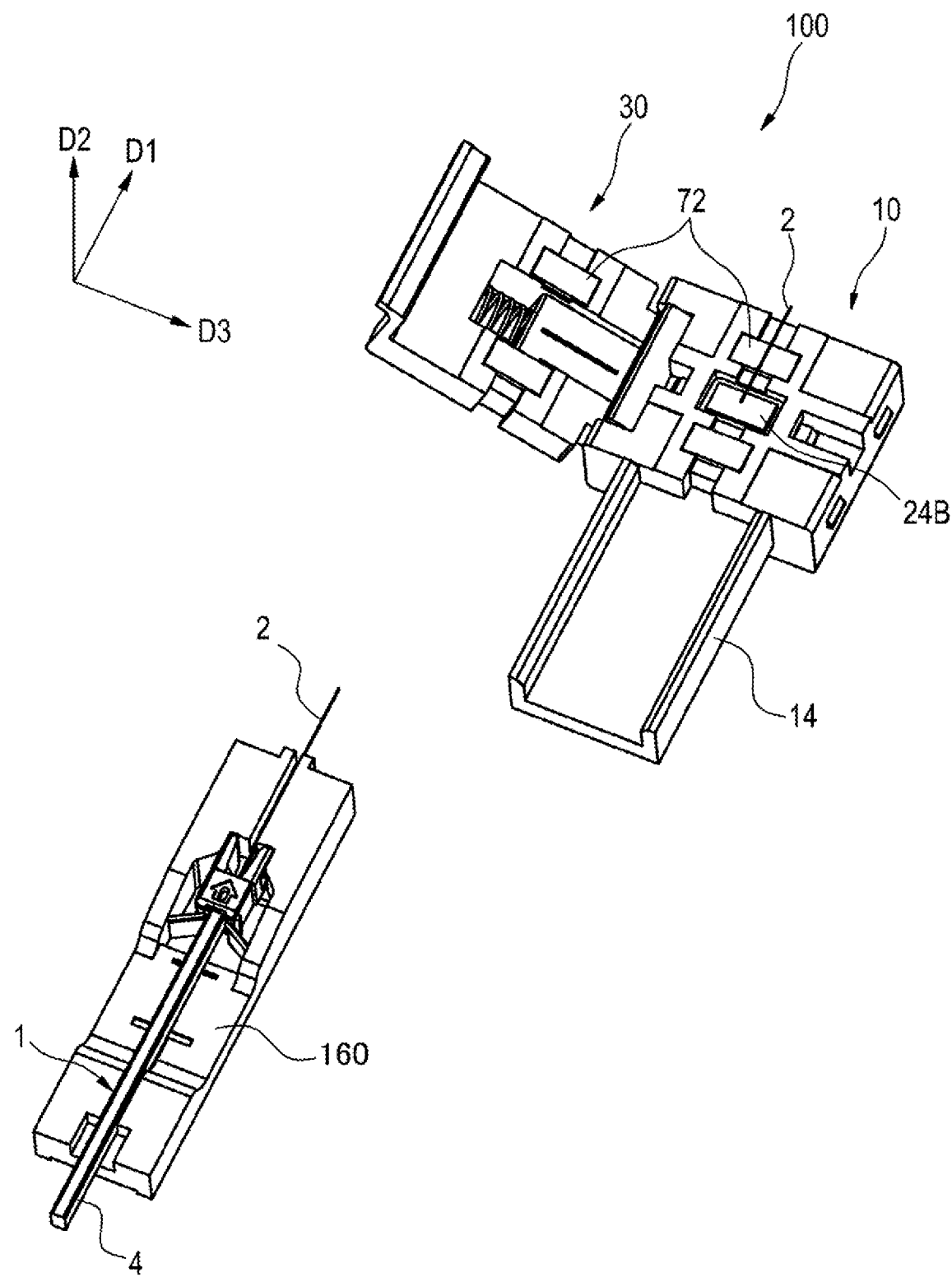
FIG. 17 is a diagram illustrating an operation of the optical fiber cleaver after the operation of FIG. 15.

Finally, as illustrated in FIG. 17, the user opens the lid unit 30 and takes out the holder 160 holding the optical fiber 1 of which the tip end of the glass fiber 2 is cleaved from the rail 14 of the optical fiber cleaver 100. Since a portion on the tip end side from the cleave plane of the glass fiber 2 (a portion retained by the pair of retainers 72) is a portion of the optical fiber 1 which is not used, the portion is destructed.

In this way, the operation of cleaving the glass fiber 2 of the optical fiber 1 using the optical fiber cleaver 100 ends.

As described above, the optical fiber cleaver 100 according to the embodiment includes the body unit 10 on which the optical fiber 1 extending in the first direction D1 is loaded, the lid unit 30 that is connected to the body unit 10 to be rotatable and is openable with respect to the body unit, and the pair of retainers 70 and 72 that are arranged to be separate from each other in the first direction D1 and retains the optical fiber 1 between the pair of retainers 70 and 72 when the lid unit 30 is closed with respect to the body unit 10. Further, the optical fiber cleaver 100 includes the cutter 58 that comes into contact with the optical fiber 1 from the one side direction of the second direction D2 to cleave the optical fiber 1 between the pair of retainers 70 and 72, the slider 50 that brings the cutter 58 into contact with the optical fiber 1 from the one direction side of the second direction D2 and moves the slider 50 to one direction side of the third direction D3, and the pressing unit 24 that advances the flaw of the optical fiber 1 to cleave the optical fiber 1. In this configuration, by moving the cutter 58 supported by the slider 50 from the second direction D2 to the third direction D3, the cutter 58 creates a flaw in the optical fiber 1 and cleaves the optical fiber 1 in the simple configuration. Therefore, it is possible to provide the optical fiber cleaver 100 that can be manufactured at low cost and can be miniaturized.

The slider 50 brings the cutter 58 into contact with the optical fiber 1 from the one direction side of the second direction D2 and moves the cutter 58 to the one direction side of the third direction D3, but the direction in which the cutter 58 is brought into contact with the optical fiber 1 is not limited to a direction following the second direction D2 (a direction parallel to the second direction D2). As illustrated in FIG. 11B, it is possible to move the slider 50 and the cutter 58 in the direction A1 sloped with respect to the second direction D2.

In the optical fiber cleaver 100 according to the embodiment, the slider 50 is connected to the lid unit 30 to be movable, the alignment groove 60 is formed in the surface of the slider 50 including the second direction D2 and the third direction D3, and the protrusion 46 which can engage with the alignment groove 60 is provided on the surface of the lid unit 30 including the second direction D2 and the third direction D3. In response to a user operation, the slider 50 can be moved to the one direction side of the third direction D3 after the slider 50 can be moved to the other direction side of the second direction D2 along the shape of the alignment groove 60. In this configuration, when the user operates the slider 50 in the state in which the optical fiber 1 is retained in the pair of retainers 70 and 72, the cutter 58 can be brought into contact with to create a flaw in the optical fiber 1 in an appropriate direction.

In the optical fiber cleaver 100 according to the embodiment, the alignment groove 60 is formed in the shape in which the cutter 58 is evacuated to the one direction side of the second direction D2 when a movement amount of the cutter 58 to the one direction side of the third direction D3 exceeds a predetermined value. In this configuration, it is possible to prevent the cutter 58 from interfering in the optical fiber 1 after the optical fiber 1 is flawed.

In the optical fiber cleaver 100 according to the embodiment, the guide convex portion 62 guiding the protrusion 46 in the second direction D2 and the third direction D3 is formed inside the alignment groove 60. In this configuration, by guiding the protrusion 46 using the guide convex portion 62, it is possible to appropriately move the cutter 58 supported by the slider 50 in a desired direction.

In the optical fiber cleaver 100 according to the embodiment, the slider 50 is urged to the other direction side of the third direction D3 by the spring 34 provided in the lid unit 30. In this configuration, when the user detaches the slider 50 from his or her hand, it is possible to return the slider 50 and the cutter 58 to the initial positions by the urging force of the spring 34.

In the optical fiber cleaver 100 according to the embodiment, the spring 34 is disposed to be sloped with respect to the third direction D3 and urges the slider 50 in the orientation including an orientation component of the one direction side of the second direction D2 and an orientation component of the other direction side of the third direction D3. In this configuration, it is possible to reliably evacuate the cutter 58 in a direction to be away from the optical fiber 1 so that the cutter 58 does not interfere in the optical fiber 1 after the optical fiber 1 is flawed.

In the optical fiber cleaver 100 according to the embodiment, the cleaving edge of the cutter 58 is in the straight shape. In this configuration, it is possible to constantly maintain the depth of the flaw of the optical fiber 1.

In the optical fiber cleaver 100 according to the embodiment, the pressing unit 24 is provided at the position facing the cutter 58, presses the optical fiber 1 from the other direction side of the second direction D2, and bends the optical fiber 1 flawed by the cutter 58 to cleave the optical fiber 1. In this configuration, by creating a flaw in the optical fiber 1 using the cutter 58 and subsequently pressing the optical fiber 1 from the opposite side to the cutter 58 using the pressing unit 24, it is possible to simply fracture the optical fiber 1.

Modification Examples

Figure 18:
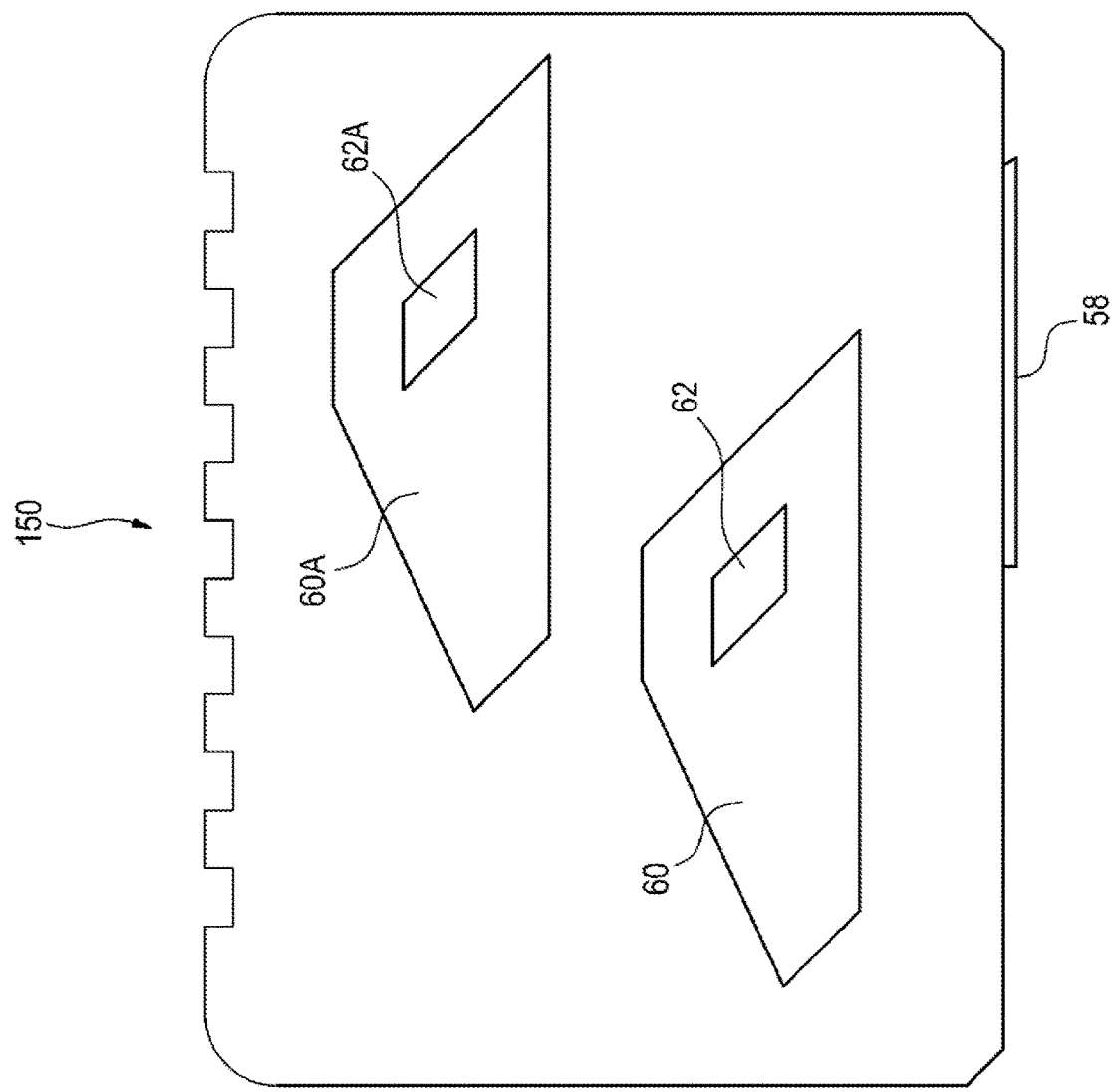
FIG. 18 is a diagram illustrating a modification example of an alignment groove formed in the slider.

As illustrated in FIG. 18, in addition to the alignment groove 60 (an example of a first alignment groove), a slider 150 may include an alignment groove 60A (an example of a second alignment groove) provided at a different position from the alignment groove 60 in at least the second direction D2. In this case, in addition to the protrusion 46 provided at the position corresponding to the alignment groove 60, a protrusion provided at a position corresponding to the alignment groove 60A can be formed inside the opening 44 of the lid unit 30. In this way, by providing the plurality of alignment grooves and the plurality of protrusions in one surface, it is possible to maintain the longitudinal direction of the slider 150 at an initial state so that the longitudinal direction is not sloped with respect to the third direction D3. It is possible to reliably move the cutter 58 in a predetermined direction (for example, any of the directions A1 to A4 illustrated in FIGS. 11A to 11E).

In the foregoing embodiment, the alignment groove 60 is formed in the slider 50 and the protrusion 46 is formed in the lid unit body 32, but the present invention is not limited to this example. The protrusion may be formed in the slider and the alignment groove may be formed in the lid unit body. The alignment groove 60 may be formed only one surface between the surfaces 50A and 50B of the slider 50 including the second direction D2 and the third direction D3 and one protrusion 46 may be formed at a position corresponding to the one alignment groove 60.

In the foregoing embodiment, the guide convex portion 62 that has the substantially trapezoidal shape and guides the protrusion 46 in the predetermined direction is formed inside the alignment groove 60, but the guide convex portion 62 may not be formed. In this case, the movement of the slider 50 in the directions A1 and A2 is guaranteed by pressing of a finger of the user and the movement of the slider 50 in the directions A3 and A4 is guaranteed by slope of the spring 34 with respect to the third direction D3. In this way, by not providing the guide convex portion 62, it is possible to improve sliding or durability of the slider 50.

In the foregoing embodiment, the slider 50 supporting the cutter 58 is provided in the lid unit 30 and the pressing unit 24 pressing and bending the optical fiber 1 flawed by the cutter 58 is provided in the body unit 10, but the present invention is not limited to this example. The body unit 10 may have a configuration equivalent to the cutter 58 and the slider 50 and the lid unit 30 may have a configuration equivalent to the pressing unit 24.

In the foregoing embodiment, as illustrated in FIGS. 9 and 10, the contact portion 24B of the pressing unit 24 is disposed at a position interposed in the second direction D2 from the glass fiber 2 in a non-pressing state, but the present invention is not limited to this example. An upper surface of the contact portion 24B may be flush with the upper surfaces of the pair of body unit side retainers 20 and 22 in the non-pressing state. In this case, in the state in which the glass fiber 2 is retained in the pair of retainers 70 and 72, the contact portion 24B comes into contact with the glass fiber 2 from the other direction side of the second direction D2. Thus, when the glass fiber 2 receives a force from the one direction side of the second direction D2 from the cutter 58, the contact portion 24B can prevent the glass fiber 2 from getting away to the other direction side of the second direction.

In the foregoing embodiment, the spring 34 is disposed to be sloped with respect to the third direction D3, but may be disposed to be parallel to the third direction D3.

In the foregoing embodiment, after the first step, the glass fiber 2 is bent by the pressing unit 24 to advance the flaw of the glass fiber 2 and cleave the glass fiber 2, but the present invention is not limited to this example. For example, after the first step, the optical fiber 1 can also be cleaved by drawing the optical fiber 1 and advancing the flaw (an example of a third step).

Second Embodiment

Figure 19:
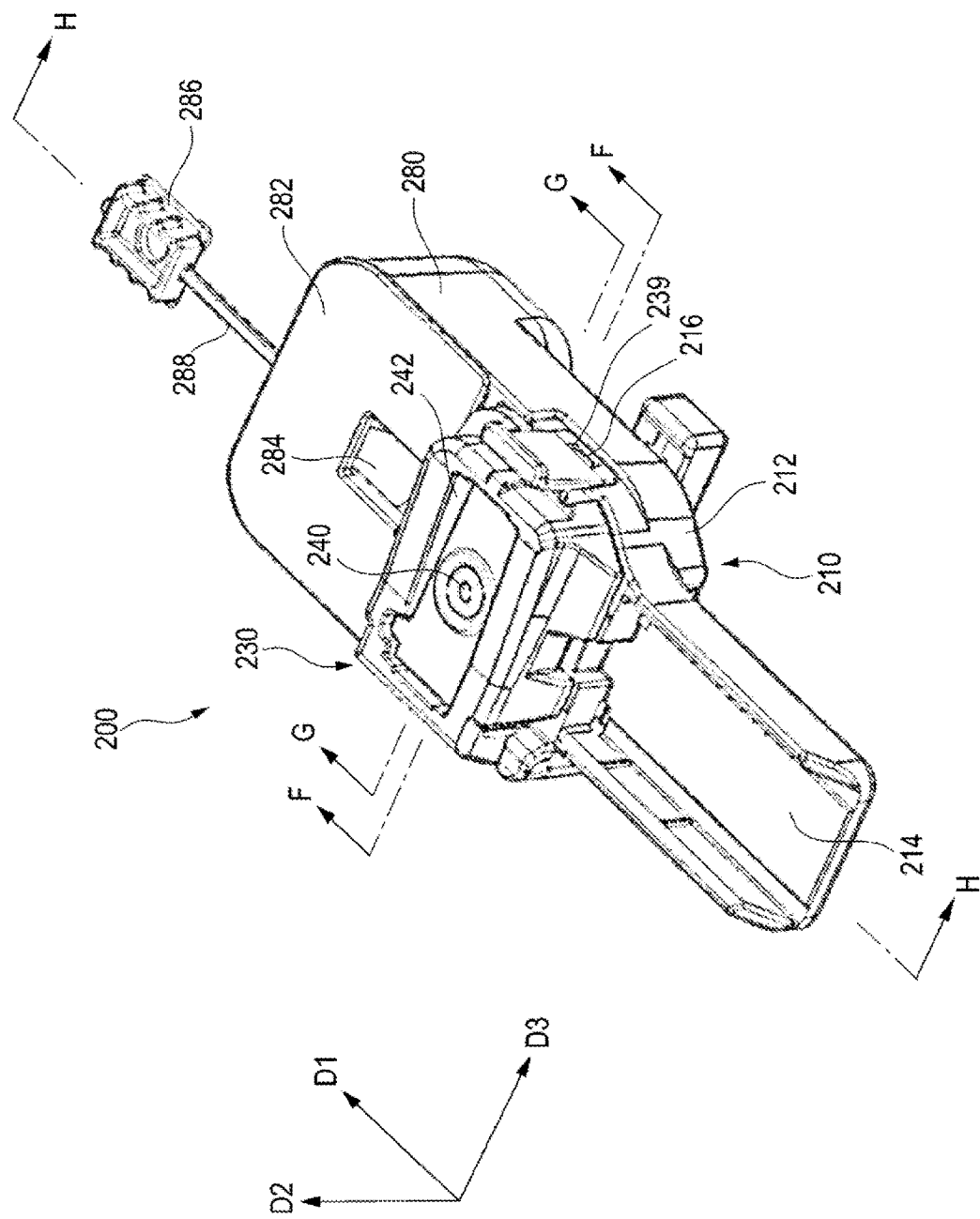
FIG. 19 is a front perspective view illustrating an optical fiber cleaver according to a second embodiment.
Figure 20:
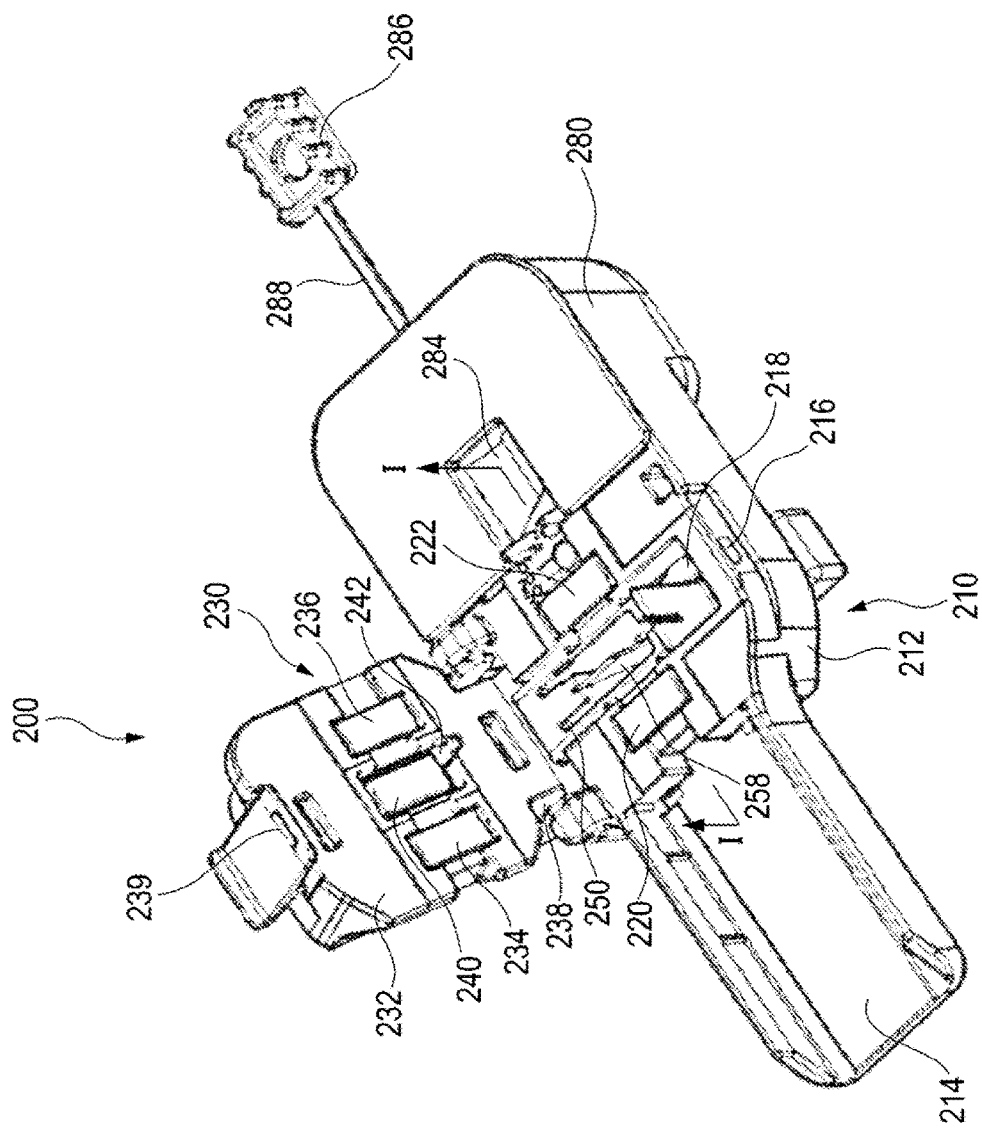
FIG. 20 is a front perspective view illustrating a state in which a lid unit of the optical fiber cleaver in FIG. 19 is opened.
Figure 21:
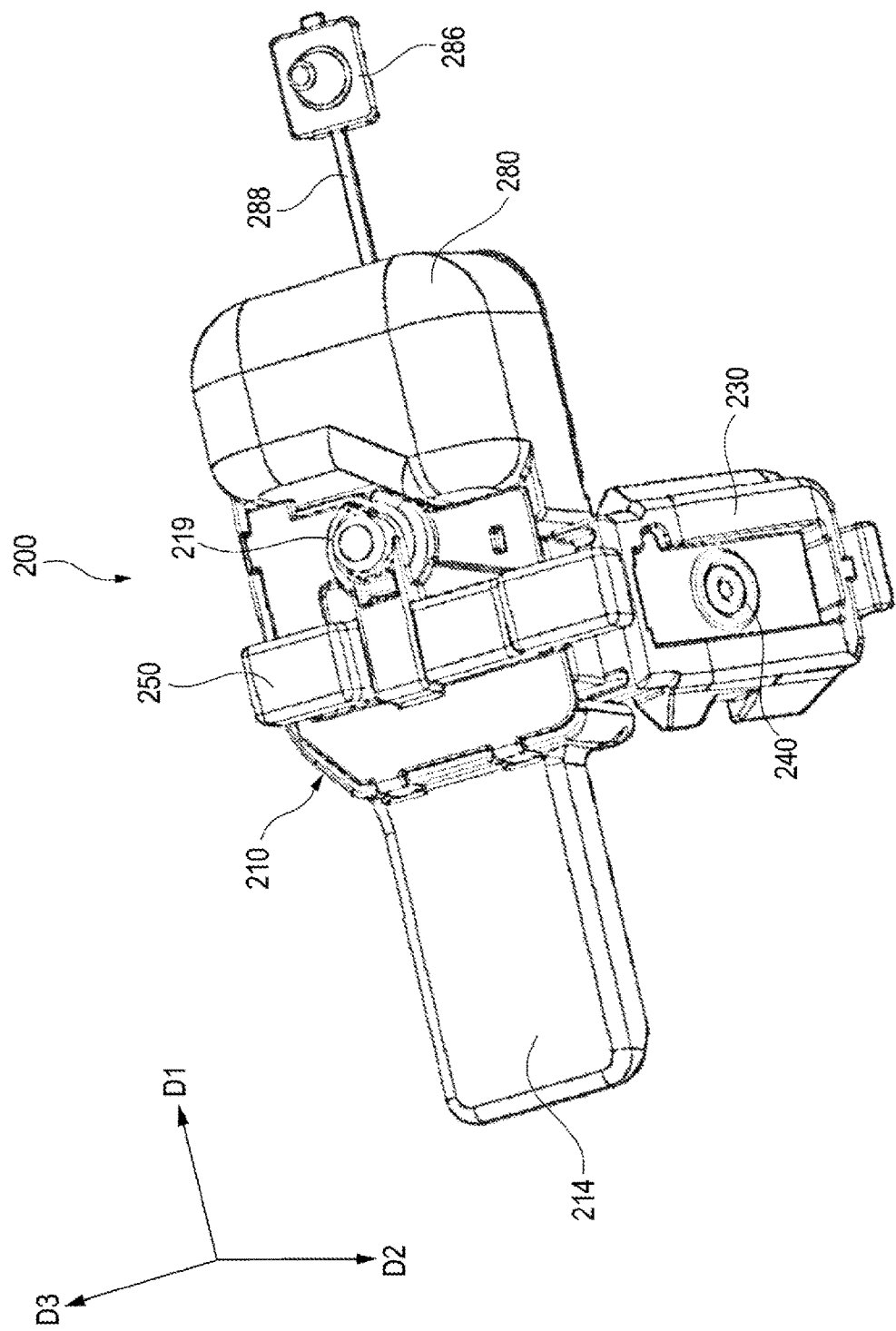
FIG. 21 is a rear perspective view illustrating the optical fiber cleaver in the state of FIG. 20.
Figure 22:
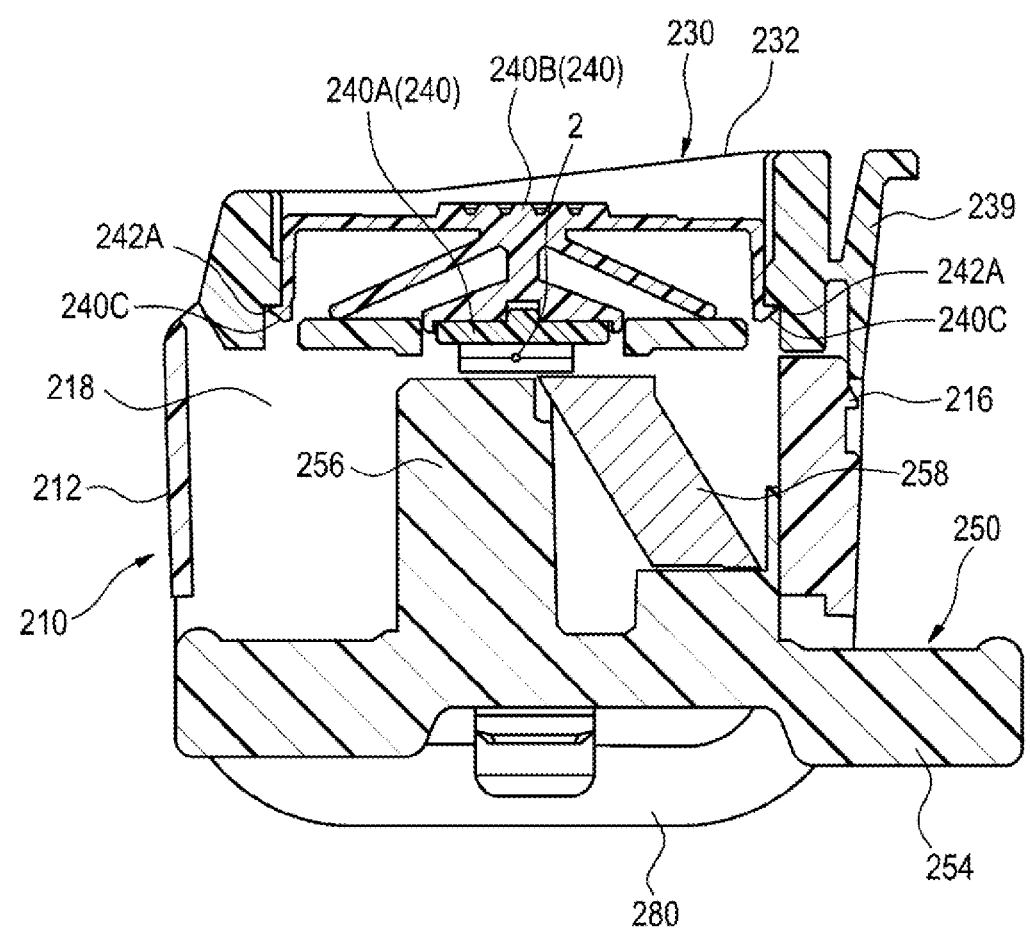
FIG. 22 is a sectional view taken along the line F-F of FIG. 19.
Figure 23:
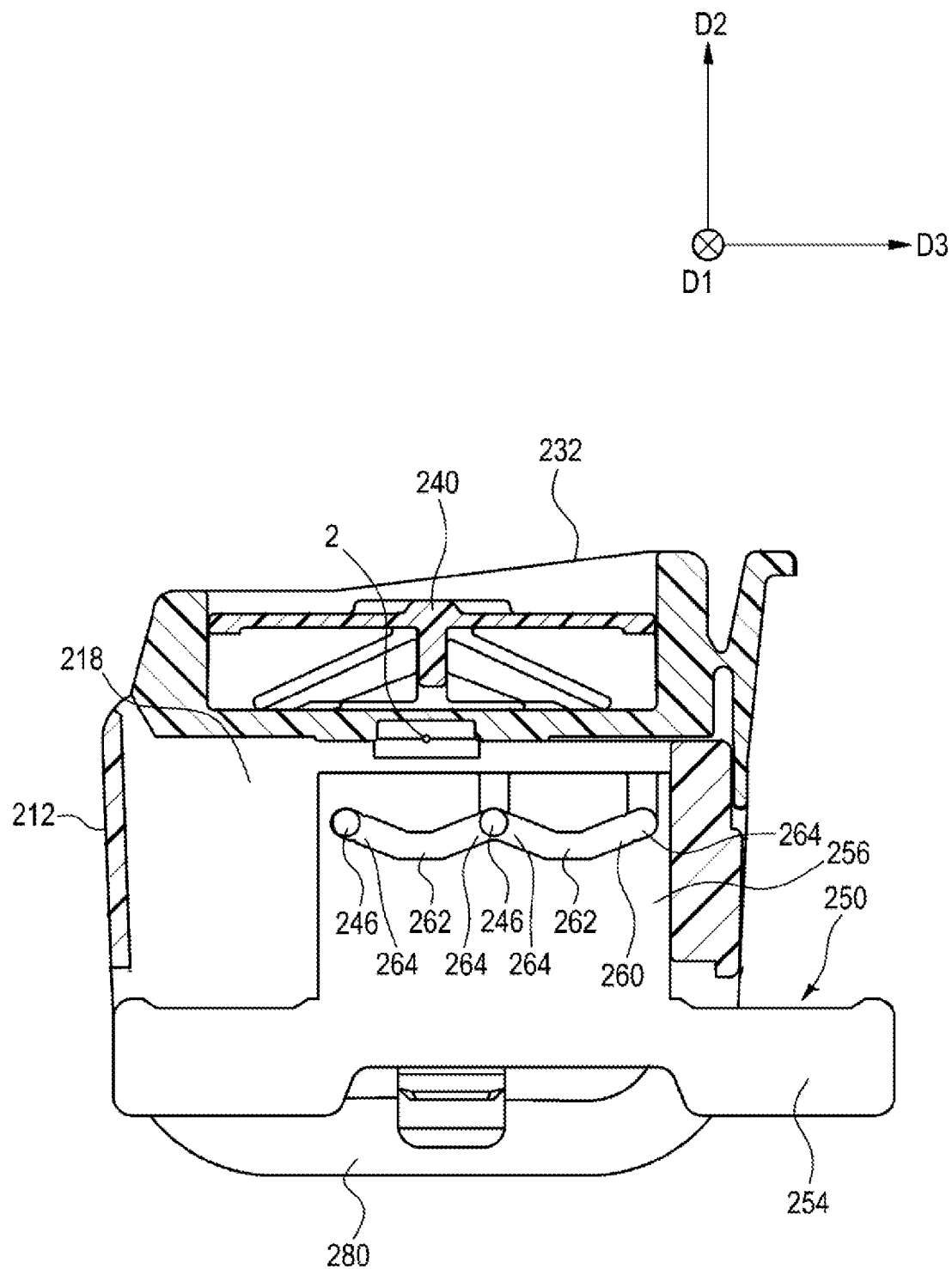
FIG. 23 is a sectional view taken along the line G-G of FIG. 19.

Next, an optical fiber cleaver 200 according to a second embodiment will be described with reference to FIGS. 19 to 29 and the like. FIG. 19 is a front perspective view illustrating the optical fiber cleaver 200 according to the second embodiment. FIG. 20 is a front perspective view illustrating a state in which a lid unit 230 of the optical fiber cleaver 200 is opened. FIG. 21 is a rear perspective view illustrating the optical fiber cleaver 200 in the state of FIG. 20. FIG. 22 is a sectional view taken along the line F-F of FIG. 19. FIG. 23 is a sectional view taken along the line G-G of FIG. 19.

The optical fiber cleaver 200 according to the second embodiment is different from the optical fiber cleaver 100 according to the first embodiment in that a slider 250 supporting a cutter 258 is provided in the body unit 210 and a pressing unit 240 is provided in the lid unit 230. Detailed description of the same configuration and function as those of the optical fiber cleaver 100 according to the first embodiment in each unit of the optical fiber cleaver 200 will be omitted.

As in the first embodiment, in a state illustrated in FIG. 19, a longitudinal direction of the optical fiber cleaver 200 (a body unit 210) is referred to as the first direction D1, a transverse direction of the optical fiber cleaver 200 is referred to as the second direction D2, and a thickness direction of the optical fiber cleaver 200 is referred to as the third direction D3. One direction side (an arrow side) of the second direction D2 is an upper side and the other direction side of the second direction D2 is referred to as a lower side in some cases.

As illustrated in FIGS. 19 to 22, the optical fiber cleaver 200 according to the second embodiment includes the body unit 210 and the lid unit 230 connected to the body unit 210 to be openable.

The body unit 210 includes a support stand 212, a rail 214, a pair of body unit side retainers 220 and 222, the slider 250 supporting the cutter 258, and a scrap accommodation portion 280.

The support stand 212 includes one engagement protrusion 216 that protrudes toward the outside on one side of the surface including the first direction D1 and the second direction D2. The engagement protrusion 216 engages with an engagement hole 239 of the lid unit 230 and is used to keep a state in which the lid unit 230 is closed with respect to the body unit 210. In the middle of the support stand 212, an opening 218 penetrated through the support stand 212 is formed in the second direction D2. A counter 300 that counts the number of cleaves of an optical fiber by the cutter 258 is provided to be adjacent to the body unit side retainer 222 of the one side of the support stand 212. The details of the counter 300 will be described later.

The slider 250 in the state in which the cutter 258 is supported is accommodated inside the opening 218. The slider 250 accommodated inside the opening 218 can be moved in the third direction D3. The details of the slider 250 will be described later.

The scrap accommodation portion 280 is provided at the end on the opposite side to the rail 214 of the body unit 210 with the support stand 212 interposed therebetween. An accommodation cover 282 formed of, for example, a resin member such as elastomer is provided in the upper side of the scrap accommodation portion 280. An opening 284 is formed at the end of the accommodation cover 282 on the side of the support stand 212. An embolus 286 is formed at the end of the accommodation cover 282 opposite to the opening 284 via a long connection portion 288. By curving the connection portion 288, the opening 284 can be blocked by the embolus 286.

The lid unit 230 includes the lid unit body 232, a pair of lid unit side retainers 234 and 236, and the pressing unit 240.

The lid unit body 232 is connected to the support stand 212 by the connection portion 238 to be rotatable. When the engagement hole 239 provided in the lid unit body 232 engages with the engagement protrusion 216 formed in the support stand 212, the lid unit body 232 can be retained in a state in which the lid unit body 232 is closed with respect to the support stand 212. The pair of lid unit side retainers 234 and 236 are arranged at positions corresponding to the pair of body unit side retainers 220 and 222 to be separated from each other in the first direction D1.

The pressing unit 240 is accommodated inside the opening 242 formed between the pair of body unit side retainers 234 and 236. The pressing unit 240 includes a contact portion 240A and a pressing button 240B, as illustrated in FIG. 22 and the like. The contact portion 240A is disposed at a position facing the slider 250 accommodated inside the opening 218 of the body unit 210. The pressing button 240B is disposed to face the outside of the lid unit 230 from the opening 242. Claws 240C curved to the outside are formed at both ends of the pressing button 240B in the third direction D3. The claws 240C engage with stepped portions 242A inside the opening 242 to regulate movement of the pressing button 240B in the second direction D2.

Next, a structure of the slider 250 will be described with reference to FIGS. 22 and 23.

As illustrated in FIGS. 22 and 23, the slider 250 includes an operation portion 254 extending in the third direction D3 and a blade retainer 256 erect on the upper side (in the second direction D2) from the operation portion 254. When the user brings his or her finger into contact with the slide operation portion 254 to operate the slider 250, the slider 250 can be moved in the third direction D3. The cutter 258 is accommodated in the blade retainer 256 of the slider 250.

As illustrated in FIG. 23, an alignment groove 260 is formed on at least one side of an outer surface of the slider 250 including the second direction D2 and the third direction D3. The alignment groove 260 is formed in a substantially W shape. That is, two U-shaped grooves are formed to be lined in the third direction D3. Only one U-shaped groove may be formed as the alignment groove 260 or a plurality of U-shaped grooves may be formed in parallel in the second direction D2. In a state in which the slider 250 is accommodated in the opening 218 of the body unit 210, two protrusions 246 protruding from the opening 218 engages with the alignment groove 260. The two protrusions 246 are disposed at a constant interval so that the protrusions 246 engage with the two U-shaped grooves. When only one U-shaped groove is formed as the alignment groove 260, only one protrusion 246 engaging with the alignment groove 260 may be formed. In this way, the alignment groove 260 is formed so that a middle 262 in a movement range of one protrusion 246 inside the alignment groove 260 is located below both ends 264 (at a position away from the glass fiber 2) in the second direction D2.

Figure 24:
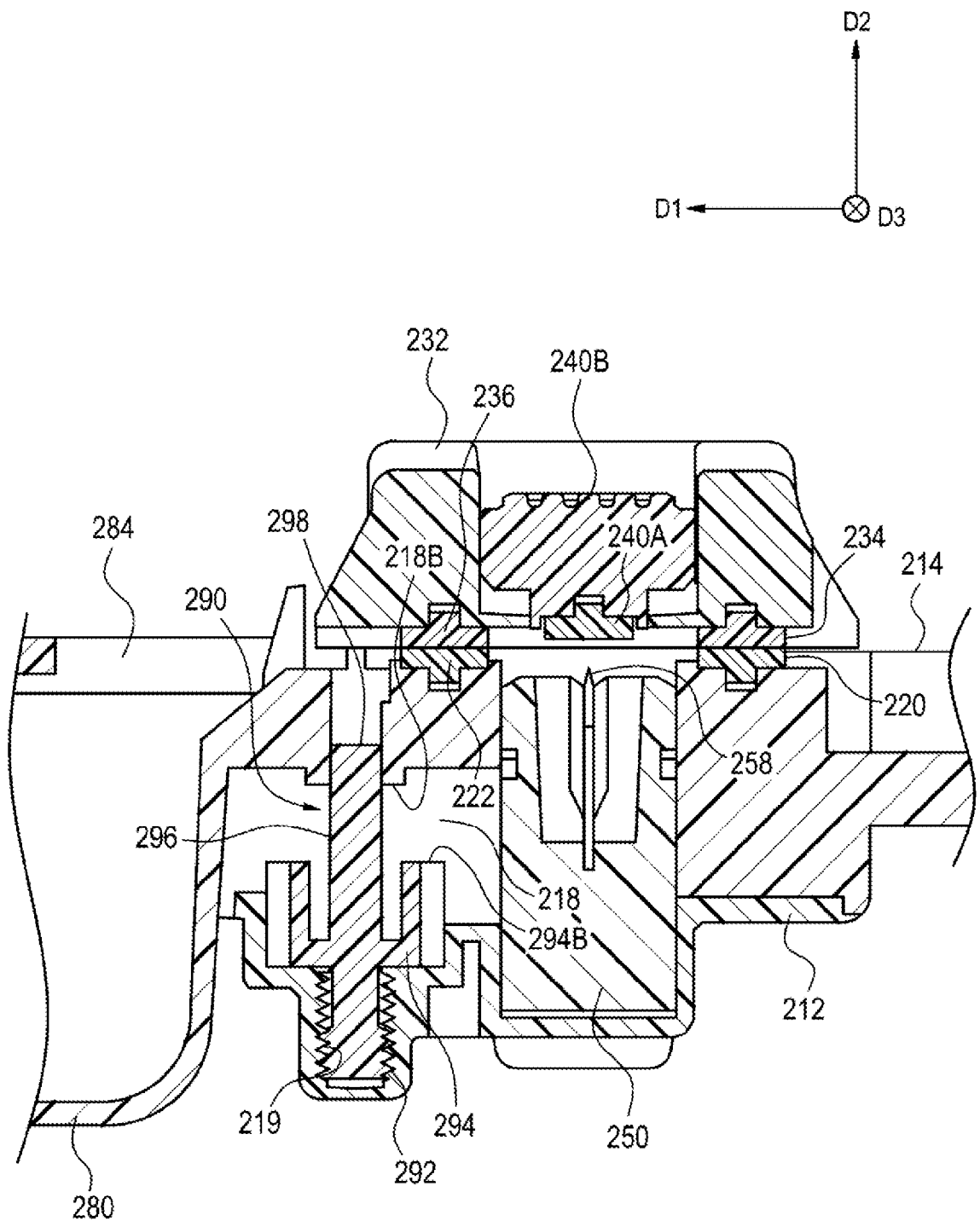
FIG. 24 is a partial sectional view taken along the line H-H of FIG. 19.
Figure 25:
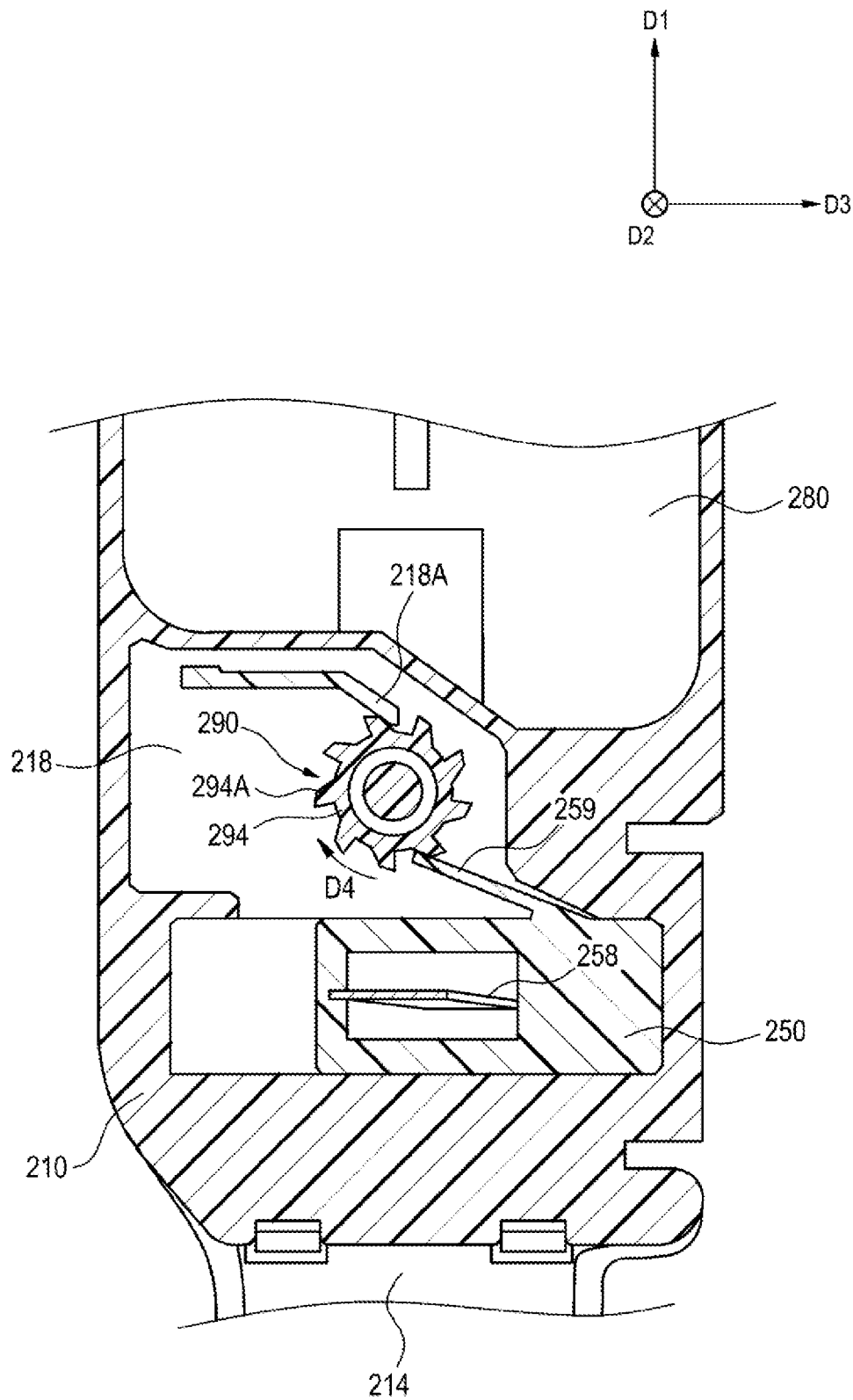
FIG. 25 is a partial sectional view taken along the line I-I of FIG. 20.

Next, a cleaving number counter and a cleaving stop mechanism for an optical fiber formed inside the support stand 212 of the body unit 210 will be described with reference to FIGS. 24 and 25. FIG. 24 is a partial sectional view taken along the line H-H of FIG. 19. FIG. 25 is a partial sectional view taken along the line I-I of FIG. 20.

As illustrated in FIG. 24, a screw member 290 that forms a part of the cleaving stop mechanism is accommodated inside the opening 218 formed in the support stand 212 at a position interposed between the slider 250 and the scrap accommodation portion 280. The screw member 290 includes a male screw portion 292 formed in the lower end, a gear portion 294 formed in the middle, and an extension portion 296 extending upward from the upper end of the gear portion 294.

The male screw portion 292 is screwed with a female screw portion 219 formed in the support stand 212. Thus, the lower end of the screw member 290 is located at the lowermost portion of the female screw portion 219 of the support stand 212 in an initial state of the optical fiber cleaver 200.

As illustrated in FIG. 25, a latch portion 259 obliquely protruding in the first direction D1 is formed in the slider 250. In the gear portion 294, a plurality of gear teeth 294A are formed to protrude slightly obliquely in a radiation direction of the gear portion 294. The plurality of gear teeth 294A are formed at positions at which the gear teeth 294A can come into contact with the latch portion 259 in a rotation state. In the opening 218, a stopper 218A is provided opposite to the location at which the latch portion 259 is provided with the gear portion 294 interposed therebetween. A part of the stopper 218A extends to be substantially parallel to the latch portion 259 and the tip end of the part is formed at a position at which the tip end can come into contact with each of the plurality of gear teeth 294A in a rotation state of the gear portion 294.

When the slider 250 is moved from a position (the right end) illustrated in FIG. 25 to the left in the third direction D3, the latch portion 259 comes into contact with a side surface of an acute angle side of one gear tooth 294A among the plurality of bear teeth 294A and pressing the gear tooth 294A, and the gear portion 294 rotates by a constant amount in a fourth direction D4. At this time, since the stopper 218A comes into contact with the side surface of an obtuse angle side of another gear tooth 294A, the stopper 218A does not interfere in the rotation of the gear portion 294. On the other hand, when the slider 250 is moved from the left end to the right in the third direction D3 in contrast to FIG. 25, the latch portion 259 comes into contact with the side surface of the obtuse angle side of one gear tooth 294A and the stopper 218A comes into contact with the side surface of the acute angle side of another tooth 294A. In this state, rotation of the gear portion 294 in the fourth direction D4 is restricted. In this way, the gear portion 294 rotates in one direction (the fourth direction D4) when the slider 250 reciprocates in the third direction D3.

Next, an operation of the optical fiber cleaver 200 will be described. FIGS. 26A to 29 are diagrams illustrating an operation of the optical fiber cleaver 200 illustrated in FIG. 19 and the like.

As in the first embodiment, as illustrated in FIG. 20, the user first opens the lid unit 230 of the optical fiber cleaver 200 with respect to the body unit 210 and then loads the holder holding the optical fiber on the rail 214. The optical fiber and the holder are not illustrated.

Subsequently, as illustrated in FIG. 19, the user opens the lid unit 230 of the optical fiber cleaver 200 with respect to the body unit 210. Thus, the glass fiber of the optical fiber is retained in the optical fiber cleaver 200. In this state, the cutter 258 supported by the slider 250 is at a position separate from the glass fiber 2 in the second direction D2 and the third direction D3 (see FIG. 22).

Figure 26A:
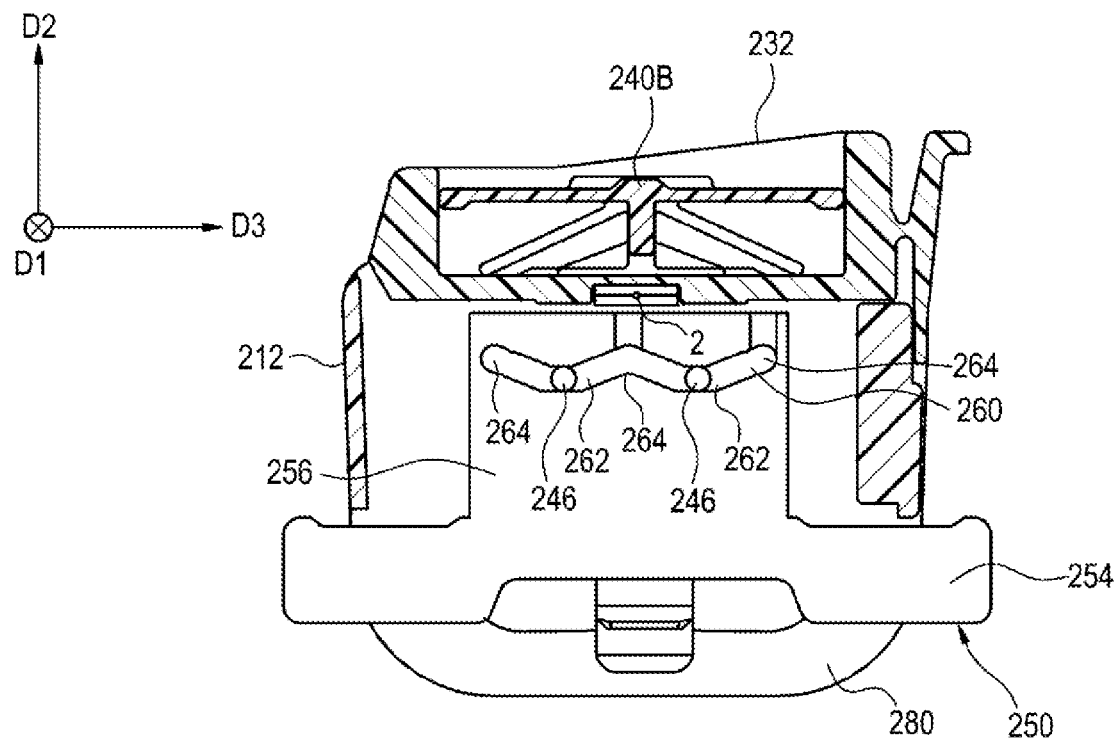
FIG. 26A is a diagram illustrating an operation of the optical fiber cleaver illustrated in FIG. 19 when an optical fiber held in a holder is cleaved.
Figure 26B:
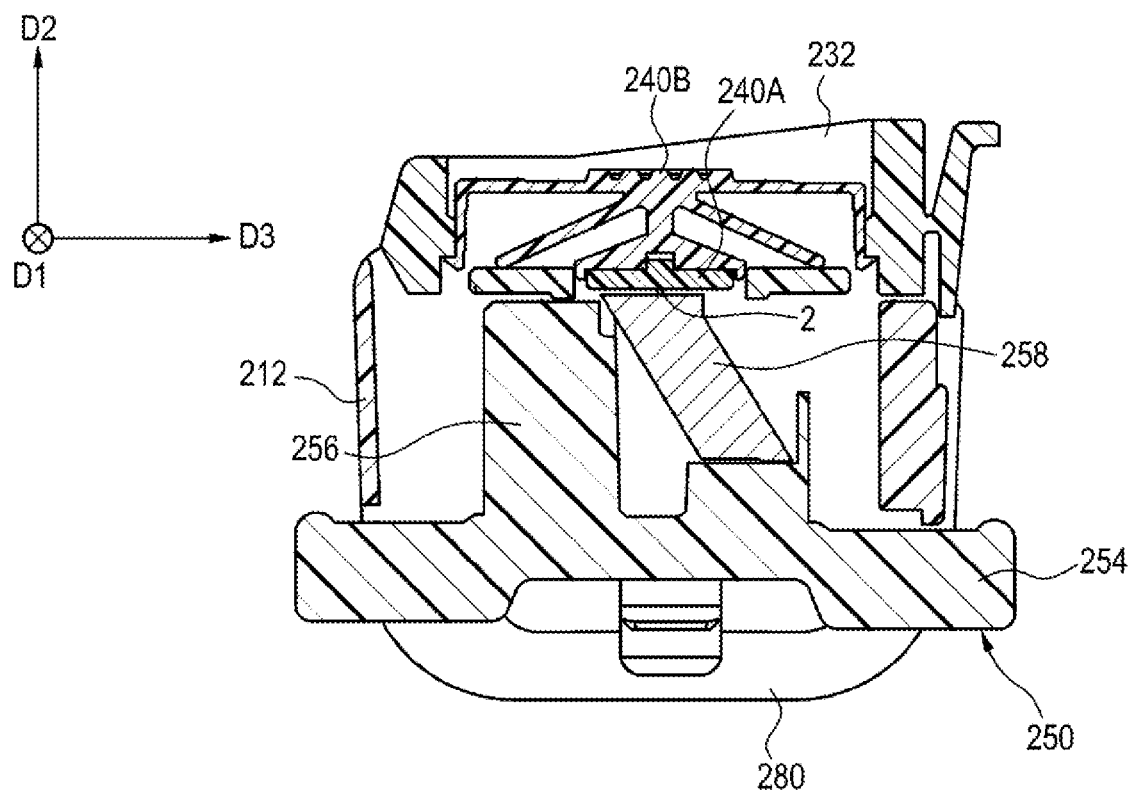
FIG. 26B is a diagram illustrating an operation of the optical fiber cleaver illustrated in FIG. 19 when an optical fiber held in a holder is cleaved.

Subsequently, as illustrated in FIGS. 26A and 26B, the user moves the slider 250 to the one direction side (the left side) of the third direction D3. At this time, as the protrusions 246 engaging with the alignment groove 260 move along the alignment groove 260, the slider 250 moves in a predetermined direction (that is, movement is regulated except for the predetermined direction). As described above, the alignment groove 260 is formed so that the middle 262 in a movement range of one protrusion 246 inside the alignment groove 260 is located below both ends 264 in the second direction D2. Therefore, when a force of the user moving the slider 250 to the left is added to the slider 250, the slider 250 is moved so that the protrusions 246 move from both ends 264 of the alignment groove 260 along the downward slope toward the middle 262. Thus, as illustrated in FIG. 26B, the slider 250 is moved to a left slope upper side and the cutter 258 supported by the slider 250 comes into contact with the lower side of the glass fiber 2 (the other direction side of the second direction D2).

Figure 27A:
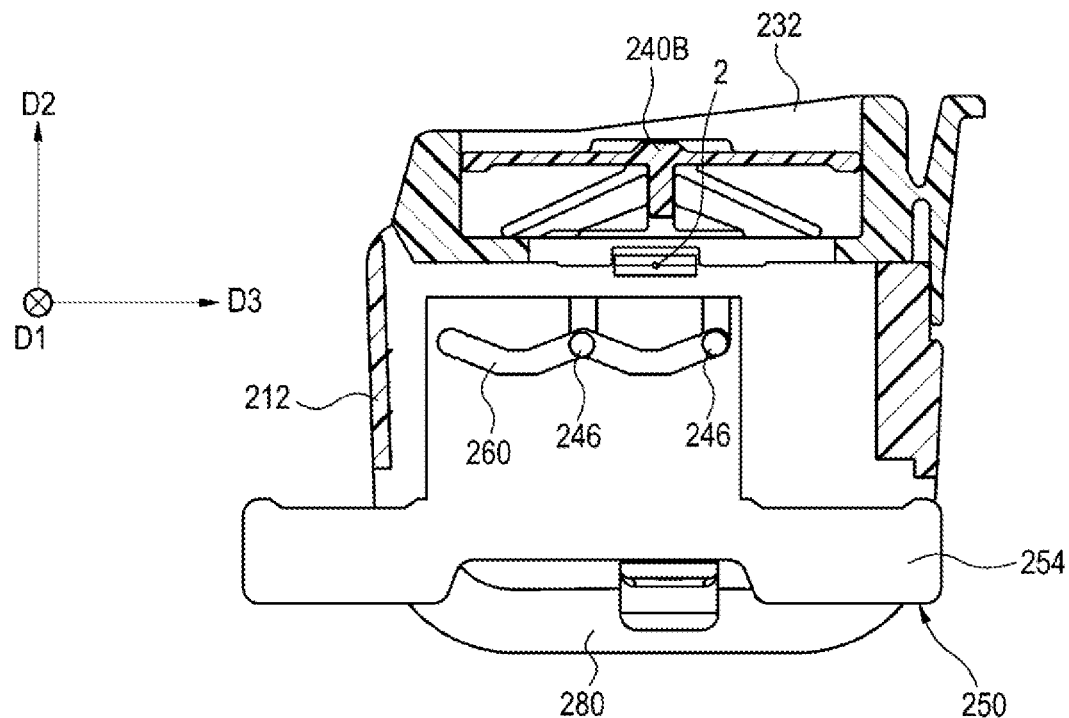
FIG. 27A is a diagram illustrating an operation of the optical fiber cleaver after the operation of FIG. 26A.
Figure 27B:
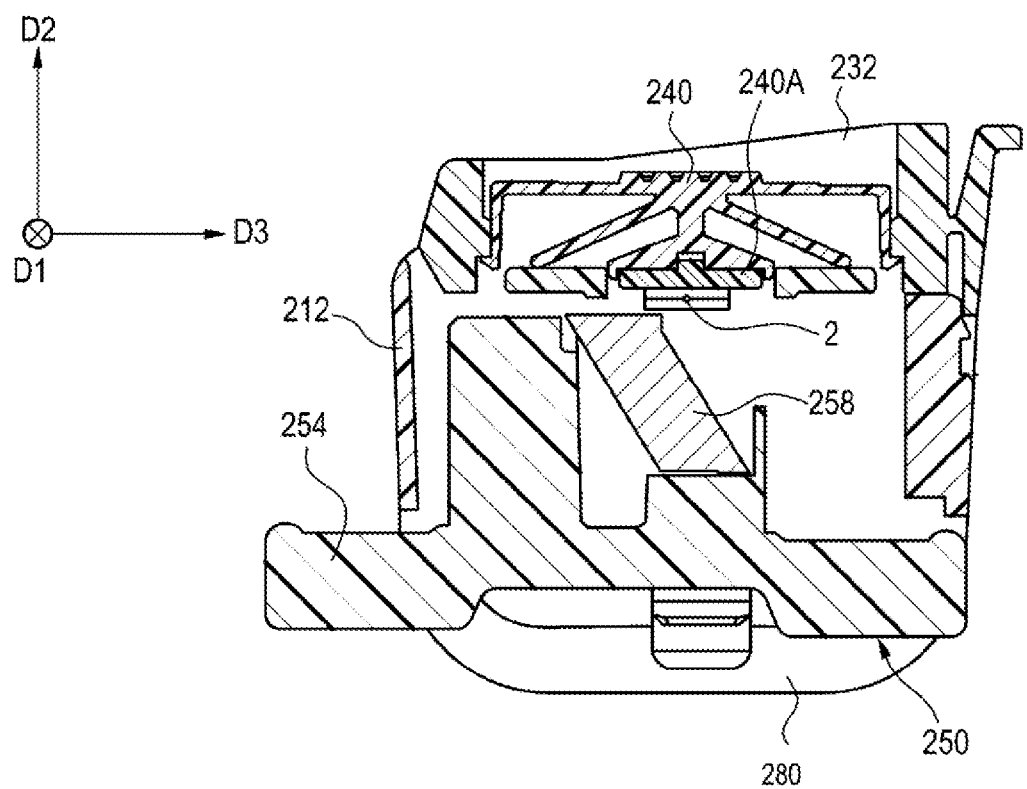
FIG. 27B is a diagram illustrating an operation of the optical fiber cleaver after the operation of FIG. 26B.

Subsequently, when a force of the user moving the slider 250 to the left is added to the slider 250, as illustrated in FIG. 27A, the slider 250 is moved so that the protrusions 246 move from the middle 262 inside the alignment groove 260 along the middle 262 and then move from the middle 262 along the upward slope toward the both ends 264. Thus, as illustrated in FIG. 27B, the slider 250 translates and subsequently moves to the left slope downward side, and the cutter 258 supported by the slider 250 moves by a constant amount in the contact state with the glass fiber 2 and subsequently moves the left slope downward side. That is, the cutter 258 is evacuated to the lower side of the glass fiber 2.

Subsequently, when the user presses the pressing button 240 provided in the lid unit 230 from the upper side, the contact portion 240A of the pressing unit 240 presses the glass fiber 2 of a portion flawed by the cutter 258 to the lower side and bends the glass fiber 2 to cleave the glass fiber 2. Then, the user opens the lid unit 230 and takes out the holder (not shown) holding the optical fiber of which the tip end of the glass fiber 2 is cleaved from the rail 214 of the optical fiber cleaver 200. When the user pushes a portion on the tip end side from the cleave plane of the glass fiber 2 from the opening 284 provided in the accommodation cover 282 of the scrap accommodation portion 280 with his or her finger, the portion is accommodated inside the scrap accommodation portion 280.

In this way, the operation of cleaving the glass fiber 2 of the optical fiber 1 using the optical fiber cleaver 200 ends. When the user moves the slider 250 moved to the one direction side of the third direction D3 to the other direction side, the subsequent optical fiber 1 can be cleaved. That is, in the optical fiber cleaver 200 according to the second embodiment, the optical fiber can be cleaved twice by reciprocating the slider 250 in the third direction D3.

Figure 28:
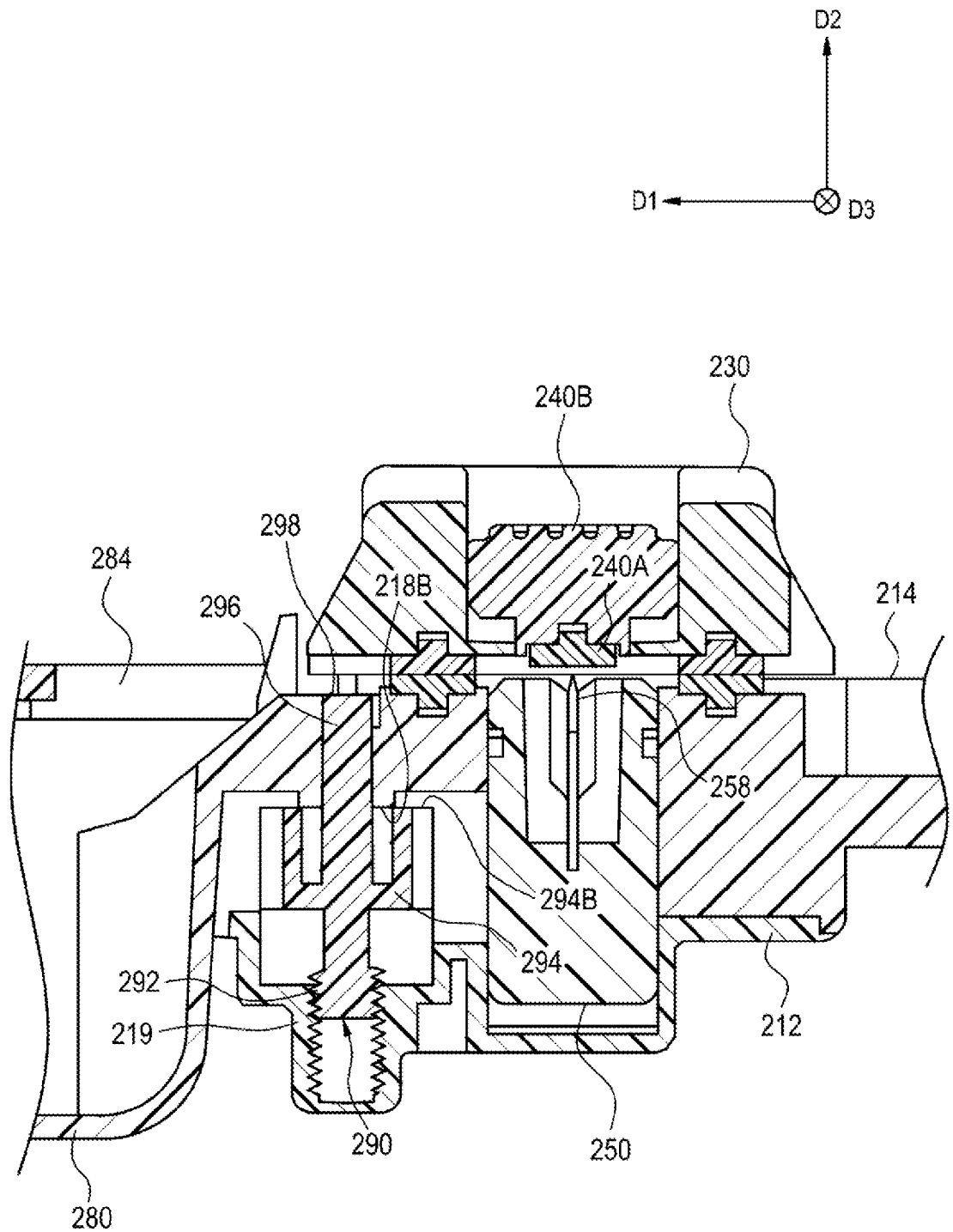
FIG. 28 is a sectional view illustrating a state in which a screw member is moved upward in response to cleaving of an optical fiber.
Figure 29:
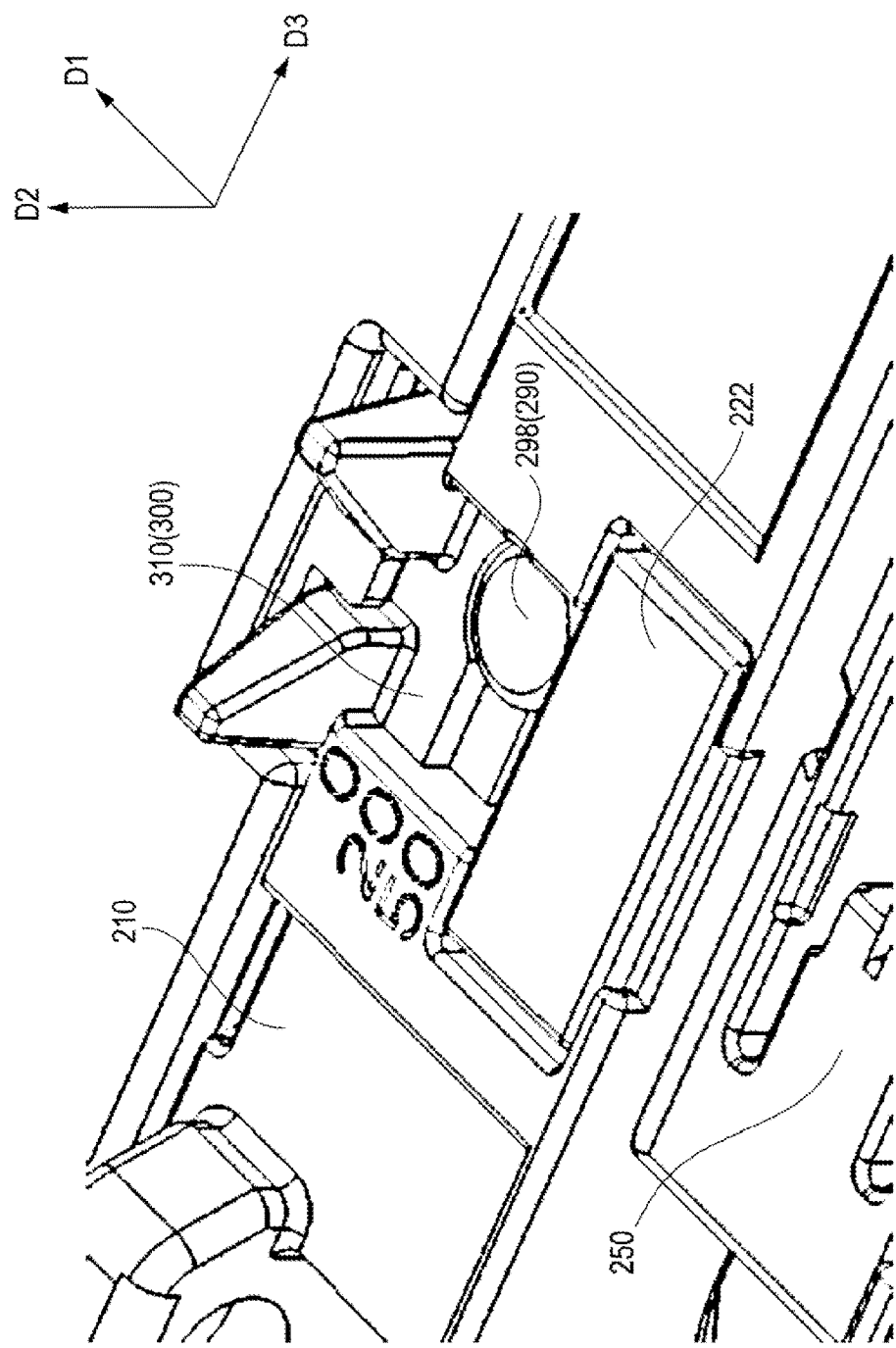
FIG. 29 is a diagram illustrating a counter included in the optical fiber cleaver of FIG. 19.

In this way, when the user reciprocates the slider 250, the number of cleaves of the optical fiber is repeated, and thus the gear portion 294 of the screw member 290 is rotated in the fourth direction D4 (see FIG. 25) and the screw member 290 gradually moves upward, as illustrated in FIG. 28. Then, as illustrated in FIG. 29, an upper end surface 298 of the screw member 290 is raised. A plurality of stepped portions 310 are provided at a position adjacent to the body unit side retainer 222 on the support stand 212. The plurality of stepped portions 310 and the upper end surface 298 of the screw member 290 form the counter 300. A number indicating a remaining number of times the optical fiber can be cleaved (the number of times indicating how many times the optical fiber can be cleaved) is provided in the lateral side of each stepped portion 310. Thus, the user can ascertain the remaining number of times the optical fiber can be cleaved seeing a positional relation between the plurality of stepped portions 310 and the upper end surface 298 of the screw member 290 gradually raised in accordance with reciprocation of the slider 250. For example, in FIG. 29, since the upper end surface 298 of the screw member 290 is raised to a position substantially flush with the stepped portion 310 at a location at which a number "0" is provided, the user can recognize that the remaining number of times the optical fiber can be cleaved is almost "0."

In this way, when the number of movements of the slider 250, that is, the number of cleaves of the optical fiber is equal to or greater than a predetermined number of times, as illustrated in FIG. 28, the upper end surface 294B of the gear portion 294 of the screw member 290 moving upward comes into contact with an upper wall protrusion 218B of the opening 218. A lower end side of the screw member 290 is screwed with the female screw portion 219 formed in the support stand 212 by the male screw portion 292. Therefore, even when the slider 250 is moved in the third direction D3 in this state, the gear portion 294 of the screw member 290 is not rotatable. Therefore, the slider 250 is not movable either. Accordingly, at a stage in which the upper end surface 294B of the gear portion 294 comes into contact with the upper wall protrusion 218B of the opening 218, a function (cleaving of the optical fiber) of the optical fiber cleaver 200 is stopped.

As described above, in the configuration of the optical fiber cleaver 200 according to the embodiment, by moving the cutter 258 supported by the slider 250 from the second direction D2 to the third direction D3, it is possible to create a flaw in the optical fiber and cleave the optical fiber in the simple configuration. Therefore, as in the optical fiber cleaver 100 according to the first embodiment, it is possible to provide the optical fiber cleaver 200 which can be manufactured at low cost and can be miniaturized.

The alignment groove 260 in the optical fiber cleaver 200 according to the embodiment is formed so that the middle 262 in the movement range of one protrusion 246 is located below both ends 264 (at a position away from the optical fiber) in the second direction D2. Thus, it is not necessary to urge the slider 250 using an elastic portion such as the spring 34 included in the optical fiber cleaver 100 according to the first embodiment and it is possible to prevent the cutter 258 from interfering in the optical fiber after the optical fiber is flawed in the simple configuration.

The optical fiber cleaver 200 according to the embodiment includes the counter 300 that counts the number of cleaves of the optical fiber by the cutter 258 and the screw member 290 (an example of a cleaving stop unit) that stops cleaving the optical fiber by restricting the movement of the slider 250 when the number of cleaves of the optical fiber is equal to or greater than a predetermined number of time. Thus, by stopping cleaving the optical fiber when the number of cleaves of the optical fiber is equal to or greater than a given number, it is possible to prevent deterioration in cleaving quality of the optical fiber due to consumption of the cutter 258. Specifically, in the simple configuration in which the rotation of the gear portion 294 provided in the screw member 290 is stopped when the number of cleaves of the optical fiber is equal to or greater than the given number, the movement of the slider 250 in the third direction D3 is restricted.

In the optical fiber cleaver 200 according to the embodiment, the number of cleaves of the optical fiber can be displayed by changing the positional relation between the counter 300 and the upper end surface 298 of the screw member 290 in response to the upward movement of the screw member 290. Thus, the user can easily ascertain a currently used number of times or a lifespan of the optical fiber cleaver 200.

In the optical fiber cleaver 200 according to the embodiment, the scrap accommodation portion 280 capable of accommodating a scrape of the optical fiber after the cleaving is provided at one end of the body unit 210. Thus, it is possible to reliably collect a destructed portion (scrap) of the optical fiber after the cleaving.

The specific and detailed embodiments of the present invention have been described, but it should be apparent to those skilled in the art that various modifications or corrections can be made without departing from the gist and scope of the present invention. The numbers, locations, shapes, and like of the above-described constituent members are not limited to the foregoing embodiments and can be changed to numbers, locations, shapes, and the like appropriate to embody the present invention.

The invention claimed is:

1. An optical fiber cleaver comprising:
a body unit on which an optical fiber extending in a first direction is loaded;
a lid unit that is connected to the body unit to be rotatable and configured to be openable with respect to the body unit;
a pair of retainers arranged to be separate from each other in the first direction and retain the optical fiber between the pair of retainers when the lid unit is closed with respect to the body unit;
a blade member configured to come into contact with the optical fiber from one direction side of a second direction intersecting the first direction between the pair of retainers and hurt the optical fiber;
a slider that retains the blade member and is configured to bring the blade member into contact with the optical fiber from the one direction side of the second direction and move the blade member to one direction side of a third direction intersecting the first and second directions; and
a surface configured to advance the hurt of the optical fiber and cleave the optical fiber, wherein
the slider is movable with respect to one of the body unit and the lid unit,
at least one alignment groove is in a first surface of one of the slider and one of the body unit and the lid unit, the first surface including the second and third directions,
at least one protrusion which is able to engage with the at least the one alignment groove is in a second surface of the other of the slider and the one of the body unit and the lid unit, the second surface including the second direction and the third direction, and
the slider is movable to the other direction side of the second direction along a shape of at least the one alignment groove and is subsequently movable to the one direction side of the third direction in accordance with a user operation.

2. The optical fiber cleaver according to claim 1, wherein the at least the one alignment groove is formed in a shape in which the blade member is evacuated to the one direction side of the second direction when a movement amount of the blade member to the one direction side of the third direction exceeds a predetermined value.

3. The optical fiber cleaver according to claim 2, wherein the at least the one alignment groove is formed so that a middle of the at least one protrusion is located to be more away from the optical fiber in the second direction than both ends of the protrusion in a movement range.

4. The optical fiber cleaver according to claim 2, wherein a guide convex portion guiding at least the one protrusion in the second and third directions is formed inside the at least the one alignment groove.

5. The optical fiber cleaver according to claim 1, wherein the slider is urged to the other direction side of the third direction by an elastic portion in one of the body unit and the lid unit.

6. The optical fiber cleaver according to claim 5, wherein the elastic portion is sloped with respect to the third direction and urges the slider in an orientation including an orientation component of the one direction side of the second direction and an orientation component of the other direction side of the third direction.

7. The optical fiber cleaver according to claim 1,
wherein at least the one alignment groove includes a first alignment groove and a second alignment groove at a position different from the first alignment groove in at least one of the second and third directions, and
wherein at least the one protrusion includes a first protrusion at a position corresponding to the first alignment groove and a second protrusion at a position corresponding to the second alignment groove.

8. The optical fiber cleaver according to claim 1, further comprising:
a counter configured to count the number of cleaves of the optical fiber by the blade member; and
a cleaving stop unit configured to restrict movement of the slider and stops cleaving the optical fiber when the number of cleaves is equal to or greater than a predetermined number of times.

9. The optical fiber cleaver according to claim 8,
wherein the slider is movable with respect to the body unit,
wherein the slider includes a latch portion protruding in at least the first direction,
wherein the cleaving stop unit is inside the body unit,
wherein the cleaving stop unit includes
a gear portion engaging with the latch unit in response to the movement of the slider and moving in one direction, and
a rotation movement unit moving the cleaving stop unit in the one direction side of the second direction in response to the rotation of the gear portion, and
wherein the rotation of the gear portion is stopped to restrict the movement of the slider when the number of cleaves is equal to or greater than the predetermined number of times.

10. The optical fiber cleaver according to claim 9,
wherein the counter counting the number of cleaves of the optical fiber stepwise is in the body unit, and
wherein the number of cleaves is displayable in accordance with a change in a positional relation between the counter and a tip end of the cleaving stop unit in response to movement of the cleaving stop unit in the one direction side of the second direction.

11. The optical fiber cleaver according to claim 1, wherein a cleaving edge of the blade member is in a straight shape.

12. The optical fiber cleaver according to claim 1, wherein the surface is at a position facing the blade member and presses the optical fiber from the other direction side of the second direction and bends the optical fiber hurt by the blade member to cleave the optical fiber.

13. The optical fiber cleaver according to claim 1, further comprising a scrap accommodation portion capable of accommodating a scrap of the optical fiber after the cleaving at one end of the body unit in the first direction.

14. An optical fiber cleaving method comprising:
a first step of hurting an optical fiber using the optical fiber cleaver according to claim 1; and
a second step of cleaving the optical fiber by bending the optical fiber using the pressing portion that presses the optical fiber from the other direction side of the second direction and bends the optical fiber hurt by the blade member to cleave the optical fiber and advancing the hurt after the first step.

15. An optical fiber cleaving method comprising:
a first step of hurting the optical fiber using the optical fiber cleaver according to claim 1; and
a second step of cleaving the optical fiber by drawing the optical fiber and advancing the hurt after the first step.

* * * * *